(12) United States Patent
Eftekhari et al.

(10) Patent No.: US 10,789,654 B1
(45) Date of Patent: Sep. 29, 2020

(54) WEB BROWSING SYSTEMS FOR ACQUIRING TAX DATA DURING ELECTRONIC TAX RETURN PREPARATION

(71) Applicant: INTUIT INC., Mountain View, CA (US)

(72) Inventors: Amir Eftekhari, San Diego, CA (US); Nankun Huang, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 922 days.

(21) Appl. No.: 14/810,116

(22) Filed: Jul. 27, 2015

(51) Int. Cl.
*G06Q 40/00* (2012.01)
*H04L 29/08* (2006.01)
*G06F 16/958* (2019.01)

(52) U.S. Cl.
CPC ......... *G06Q 40/123* (2013.12); *G06F 16/958* (2019.01); *H04L 67/02* (2013.01); *H04L 67/10* (2013.01)

(58) Field of Classification Search
CPC ...... G06Q 40/12; G06Q 40/00; G06F 21/566; G06F 40/106; G06F 11/3457; H04L 67/08
See application file for complete search history.

(56) References Cited

U.S. PATENT DOCUMENTS

| | | | | |
|---|---|---|---|---|
| 7,565,312 B1 * | 7/2009 | Shaw | G06Q 40/02 | 705/30 |
| 7,668,763 B1 * | 2/2010 | Albrecht | G06Q 40/02 | 705/30 |
| 7,747,484 B2 * | 6/2010 | Stanley | G06Q 40/123 | 705/31 |
| 7,756,761 B1 * | 7/2010 | Albrecht | G06Q 40/02 | 705/31 |
| 7,805,343 B1 * | 9/2010 | Lyons | G06Q 40/123 | 705/31 |
| 7,853,494 B2 * | 12/2010 | Wyle | G06F 17/243 | 705/19 |
| 7,860,763 B1 * | 12/2010 | Quinn | G06F 17/243 | 705/30 |
| 7,912,767 B1 * | 3/2011 | Cheatham | G06Q 40/123 | 705/31 |
| 8,072,926 B1 * | 12/2011 | Billman | H04L 67/08 | 345/600 |

(Continued)

OTHER PUBLICATIONS

"Tax Apps", Home News Tribune, East Brunswick, N.J., Mar. 18, 2012, pp. 1-4. (Year: 2012).*

(Continued)

*Primary Examiner* — Mohammad Z Shaikh
(74) *Attorney, Agent, or Firm* — DLA Piper LLP (US)

(57) ABSTRACT

A system for acquiring tax data during electronic tax return preparation includes a client computer configured to render a first webpage and receive interface data from a tax data source computer. The system also includes a browser server computer configured to receive the interface data from the client computer, process the interface data to generate rendering instructions, and transmit the rendering instructions to the client computer. The client computer and the browser server computer are configured such that, when the client computer executes the rendering instructions, the client computer renders a secondary webpage. The secondary webpage is controllable independent of the primary webpage.

22 Claims, 18 Drawing Sheets

(56) References Cited

U.S. PATENT DOCUMENTS

| | | | | |
|---|---|---|---|---|
| 8,126,787 | B1* | 2/2012 | Leek | G06Q 10/10 705/31 |
| 8,204,805 | B2* | 6/2012 | Eftekhari | G06F 21/31 705/19 |
| 8,355,966 | B1* | 1/2013 | Vu | G06F 40/174 705/30 |
| 8,806,646 | B1* | 8/2014 | Daswani | H04L 63/1425 713/161 |
| 8,995,967 | B1* | 3/2015 | Billman | H04L 67/08 370/328 |
| 9,069,869 | B1* | 6/2015 | Quinn | G06F 16/9566 |
| 9,256,691 | B2* | 2/2016 | Handrigan | G06F 9/542 |
| 9,444,824 | B1* | 9/2016 | Balazs | H04L 63/08 |
| 9,734,136 | B1* | 8/2017 | Mody | G06F 17/2247 |
| 9,774,738 | B1* | 9/2017 | Langley | H04M 3/5191 |
| 9,786,017 | B1* | 10/2017 | Ohme | G06Q 40/123 |
| 9,787,597 | B1* | 10/2017 | Miller | H04L 47/70 |
| 10,122,856 | B1* | 11/2018 | Langley | H04M 3/5191 |
| 10,425,535 | B1* | 9/2019 | Langley | H04M 3/5191 |
| 2002/0015042 | A1* | 2/2002 | Robotham | G06F 3/14 345/581 |
| 2004/0078271 | A1* | 4/2004 | Morano | G06Q 20/207 705/19 |
| 2004/0254927 | A1* | 12/2004 | Lang | G06Q 40/02 |
| 2005/0065855 | A1* | 3/2005 | Geller | G06Q 20/12 705/26.1 |
| 2006/0031077 | A1* | 2/2006 | Dalton | G06Q 30/02 702/27 |
| 2006/0085304 | A1* | 4/2006 | Buarque De Macedo | G06F 17/243 705/31 |
| 2007/0033130 | A1* | 2/2007 | Murray | G06Q 40/123 705/36 T |
| 2007/0250418 | A1* | 10/2007 | Banks | G06Q 40/02 705/31 |
| 2008/0189757 | A1* | 8/2008 | Schackow | G06F 21/53 726/1 |
| 2010/0146523 | A1* | 6/2010 | Brigaut | G06F 17/30203 719/330 |
| 2010/0256971 | A1* | 10/2010 | Tisserand | G06F 9/45529 703/21 |
| 2010/0274606 | A1* | 10/2010 | Fain | G06Q 30/06 705/50 |
| 2012/0136764 | A1* | 5/2012 | Miller | G06Q 40/123 705/31 |
| 2013/0226992 | A1* | 8/2013 | Bapst | H04L 67/10 709/203 |
| 2014/0068413 | A1* | 3/2014 | Christensen | G06F 8/34 715/234 |
| 2014/0297426 | A1* | 10/2014 | Young | G06Q 30/0271 705/14.67 |
| 2015/0081470 | A1* | 3/2015 | Westphal | G06Q 30/0631 705/26.7 |
| 2015/0161087 | A1* | 6/2015 | Khoo | G06F 16/957 715/234 |
| 2015/0278534 | A1* | 10/2015 | Thiyagarajan | G06F 21/62 726/28 |
| 2016/0034594 | A1* | 2/2016 | Baldwin | G06F 40/186 715/234 |
| 2016/0086168 | A1* | 3/2016 | McKelvey | G06Q 20/34 705/71 |
| 2016/0098783 | A1* | 4/2016 | Margalit | G06Q 30/0635 705/26.5 |
| 2016/0275627 | A1 | 9/2016 | Wang et al. | |

OTHER PUBLICATIONS https://www.puffinbrowser.com/index.php), Jul. 27, 2015 (5pages).
U.S. Appl. No. 14/871,366, filed Sep. 30, 2015, Inventor: Amir Eftekhari et al., (unpublished).
U.S. Appl. No. 14/925,633, filed Oct. 28, 2015, Inventor: Amir Eftekhar et al., (unpublished).
U.S. Appl. No. 15/164,777, filed May 25, 2016, Inventor: Paul F. Hubbard et al., (unpublished).
U.S. Appl. No. 14/871,802, filed Sep. 30, 2015, Inventor: Amir Eftekhari et al., (unpublished).

* cited by examiner

WEB BROWSING SYSTEMS FOR ACQUIRING TAX DATA DURING ELECTRONIC TAX RETURN PREPARATION

SUMMARY

Embodiments are directed to web browsing systems for acquiring tax data during electronic tax return preparation.

In one embodiment directed to a system for acquiring tax data during electronic tax return preparation, the system includes a client computer configured to render a first webpage and receive interface data from a tax data source computer. The system also includes a browser server computer configured to receive the interface data from the client computer, process the interface data to generate rendering instructions, and transmit the rendering instructions to the client computer. The client computer and the browser server computer are configured such that, when the client computer executes the rendering instructions, the client computer renders a secondary webpage. The secondary webpage is controllable independent of the primary webpage.

In another embodiment directed to a system for acquiring tax data during electronic tax return preparation, the system includes a client computer configured to render a first webpage and receive interface data from a browser server computer. The system also includes a browser server computer configured to receive the interface data from a tax data source computer, process the interface data to generate rendering instructions, and transmit the rendering instructions to the client computer. The client computer and the browser server computer are configured such that, when the client computer executes the rendering instructions, the client computer renders a secondary webpage. The secondary webpage is controllable independent of the primary webpage.

In an embodiment of a computer-implemented method of acquiring tax data during preparation of an electronic tax return, the method includes a client computer rendering a first webpage. The method also includes the client computer receiving interface data from a tax data source computer. The method further includes a browser server computer receiving the interface data from the client computer. Moreover, the method includes the browser server computer processing the interface data to generate rendering instructions. In addition, the method includes the browser server computer transmitting the rendering instructions to the client computer. The method also includes, when the client computer executes the rendering instructions, the client computer rendering a secondary webpage, where the secondary webpage is controllable independent of the primary webpage.

In another embodiment of a computer-implemented method of acquiring tax data during preparation of an electronic tax return, the method includes a client computer rendering a first webpage. The method also includes a browser server computer receiving the interface data from a tax data source computer. The method further includes the browser server computer processing the interface data to generate rendering instructions. Moreover, the method includes the browser server computer transmitting the rendering instructions to the client computer. In addition, the method includes, when the client computer executes the rendering instructions, the client computer rendering a secondary webpage, where the secondary webpage is controllable independent of the primary webpage.

In yet another embodiment of a web browsing system for acquiring tax data during electronic tax return preparation, the system includes a client computer configured to: (i) render a primary webpage including a tax return preparation user interface for a tax return preparation program; (ii) render a secondary webpage within the primary webpage, the secondary webpage including a financial account user interface for accessing a taxpayer financial account hosted on a financial account computer; (iii) receive tax data from the financial account computer through the secondary webpage; (iv) receive user data and user input from a user; (v) send the user data and the user input to the financial account computer; and (vi) receive financial account webpage instructions from the financial account computer. The system also includes a browser server computer configured to: (i) receive the user data and the user input from the client computer; (ii) receive the tax data from the client computer; (iii) receive financial account webpage instructions from the client computer; (iv) process the received financial account webpage instructions into financial account webpage rendering instructions; and (v) send the financial account webpage rendering instructions to the client computer. The client computer and the browser server computer are operatively coupled to each other.

In still another embodiment of a web browsing system for acquiring tax data during electronic tax return preparation, the system includes a client computer configured to: (i) render a primary webpage including a tax return preparation user interface for a tax return preparation program; (ii) render a secondary webpage within the primary webpage, the secondary webpage including a financial account user interface for accessing a taxpayer financial account hosted on a financial account computer; and (iii) receive user data and the user input from a user. The system also includes a browser server computer configured to: (i) receive the user data and the user input from the client computer; (ii) send the user data and the user input to the financial account computer; (iii) receive tax data from the financial account computer; (iv) receive web browser instructions from the financial account computer; (v) process the received web browser instructions into rendering instructions; and (vi) send the rendering instructions to the client computer. The client computer and the browser server computer are operatively coupled to each other.

In another embodiment directed to a system for acquiring tax data during electronic tax return preparation, the system includes a client computer configured to render a first webpage and receive interface data from a tax data source computer. The system also includes a browser server computer configured to receive the interface data from the client computer, process the interface data to generate rendering instructions, and transmit the rendering instructions to the client computer. The client computer and the browser server computer are configured such that, when the client computer executes the rendering instructions, the client computer executes a secondary webpage. The secondary webpage is controllable independent of the primary webpage.

In an embodiment directed to a system for acquiring third party data, the system includes a client computer configured to render a first webpage and receive interface data from a third party data source computer. The system also includes a browser server computer configured to receive the interface data from the client computer, process the interface data to generate rendering instructions, and transmit the rendering instructions to the client computer. The client computer and the browser server computer are configured such that, when the client computer executes the rendering instructions, the client computer executes a secondary webpage. The secondary webpage is controllable independent of the primary webpage.

In a single or multiple embodiments, the interface data includes data such as webpage layout data, a web address, and/or authentication data. In single or multiple embodiments, the client computer and the browser server computer are connected by a network. The network may be the Internet. In a single or multiple embodiments, the web browsing system is sandboxed on the client computer. In a single or multiple embodiments, the primary webpage may be a webpage of a tax return preparation program.

In a single or multiple embodiments, the client computer is also configured to transmit a tax data request to the tax data source computer. The client computer may also be configured to receive tax data from the tax data source computer in response to the tax data request. The client computer may also be configured to transmit to the received tax data to the browser server computer.

In a single or multiple embodiments, the secondary webpage emulates a tax data webpage hosted on the tax data source computer. In single or multiple embodiments, the client computer and browser server computer are configured such that, when the client computer executes the rendering instructions, the client computer renders the secondary webpage in a modal window in the primary webpage.

In a single or multiple embodiments, the client computer is configured to request and receive authorization to send the tax data to a tax return preparation program running on a tax return preparation computer before the client computer accesses the tax data. In those embodiments, the authorization may relate to a plurality of tax data.

In a single or multiple embodiments, the client computer is configured to request and receive authorization to send the tax data to a tax return preparation program running on a tax return preparation computer after the client computer accesses the tax data. In those embodiments, the authorization may be limited to the accessed tax data.

In a single or multiple embodiments, the third party data is financial data. In a single or multiple embodiments, executing the secondary webpage includes rendering the secondary webpage.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1:
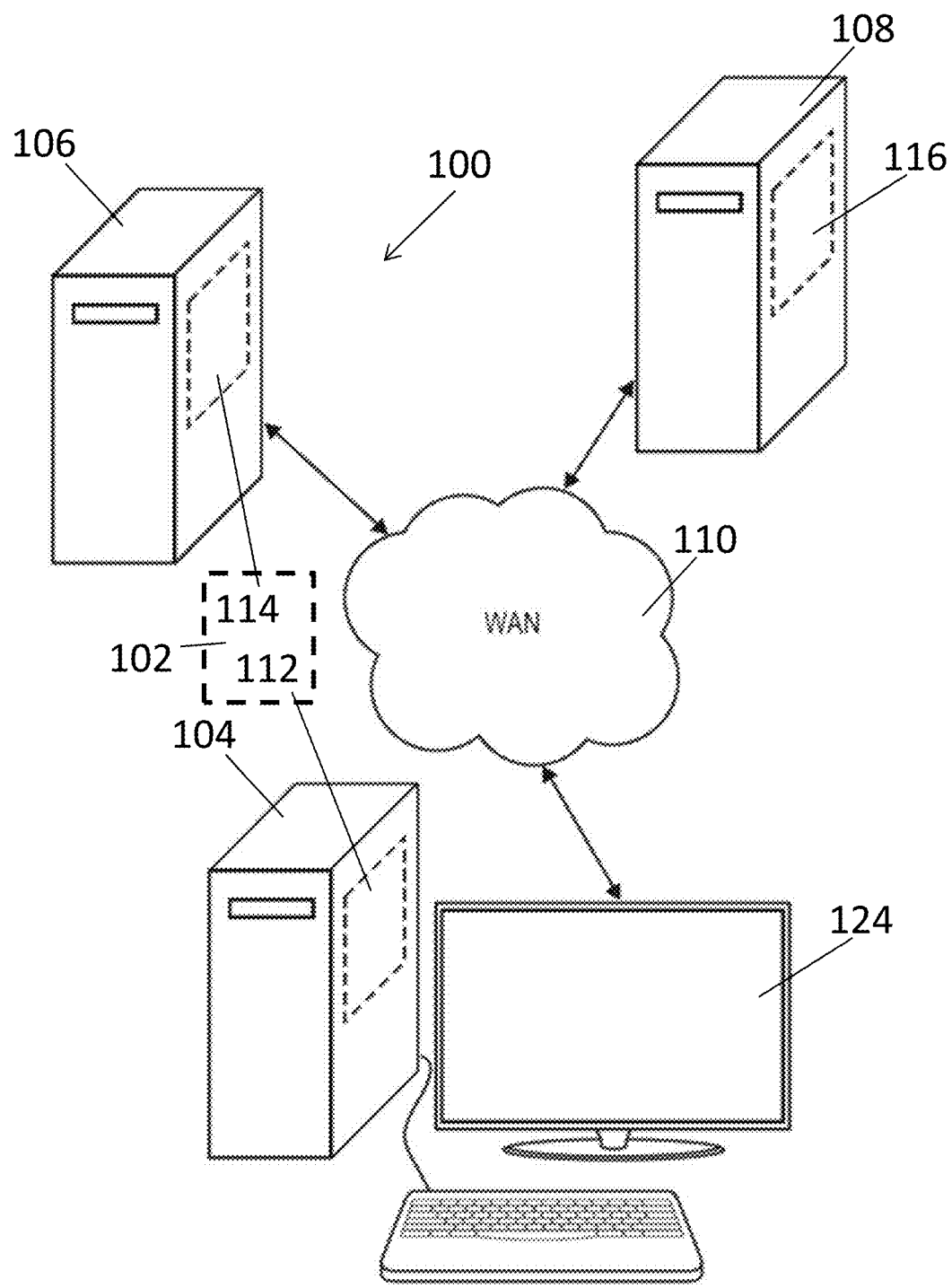
FIGS. 1 to 4 are schematic diagrams illustrating the implementation of tax data acquisition browsers on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

During preparation of tax returns, tax data must be acquired to complete the tax return. While tax data can be entered manually by a user/preparer, many electronic tax return preparation systems can acquire tax data automatically (without human intervention after authorization) or semi-automatically (with minimal human intervention e.g., provision of financial account authentication information) from third party websites hosted on third party computers through a network, such as the Internet.

Tax return preparation can be performed by the taxpayer or a tax professional using an electronic tax return preparation program. Regardless of who prepares the tax return, the tax return preparation process is often paused or halted one or more times for the user to acquire tax data needed to complete the tax return. These disruptions in the tax return preparation process are opportunities for the user to walk away from the process, which can lead to errors related to restarting the process or unfinished tax returns.

Tax data is typically found on paper or electronic documents, which may not be immediately available to the user. Therefore, manually acquiring tax data for tax return preparation may include searching for paper documents, or accessing electronic documents or information from a third party website ("tax data websites"; e.g., payroll processor websites for W-2 information, banking account websites for 1099-INT information, brokerage account websites for 1099-DIV information, etc.) hosted on a third party computer.

While preparing a tax returning using an online electronic tax return preparation system, tax data from third party websites can be entered manually by the user, automatically, or semi-automatically. Manual data entry typically involves opening a new browser in a new window or a new tab. Tax data obtained from the new browser (e.g., data or electronic documents) must then be manually entered or uploaded into the online electronic tax return preparation system. While this manual process can successfully acquire tax data, it introduces opportunities for user error, and it can frustrate users who must switch between software experiences.

Alternative to manual tax data entry include automatic and semi-automatic tax data acquisition. Traditionally, acquiring tax data from third party websites through networks has been automated (including automatic and semi-automatic tax data acquisition) using one of two solutions: Application Programming Interface ("API") connection to a third party computer through a network; and screen scraping of third party webpages accessed through a network. While an API connection can be used to collect tax data from a third party website through a network, this solution requires manual integration by programmers on both the ends of the network connection, including manual selection of a data interchange format. While screen scraping of third party webpages can be used to collect tax data from a third party website through a network, this solution requires users to provide sensitive authentication information to an electronic tax return preparation program. It also requires the electronic tax return preparation program to have information regarding the layout of the third party webpage.

Embodiments described in this application are directed to tax data acquisition systems for automating the tax data acquisition process, from portions to the entirety thereof. In particular, an exemplary system includes a client computer and a browser server computer connected by a network. The system also includes a web browser having at least one portion running on the client computer and at least one other portion running on the browser server computer. Further, the system is connected by a network to a third party computer hosting a third party website including tax data. The system is configured to execute primary and secondary webpages, where the primary webpage is related to an electronic tax return preparation program and the secondary webpage emulates the third party webpage. Executing primary and secondary webpages may include instantiating, rendering or displaying the webpages. The system is also configured to receive tax data through the secondary webpage, and to send the received tax data to the electronic tax return preparation program, after receiving authorization to do so.

In one specific embodiment, the secondary webpage is rendered in the primary webpage. The secondary webpage may be rendered in a modal window such that the primary webpage remains open, but is inaccessible, until the modal secondary webpage is closed. The browser may also be sandboxed on the client computer to limit access to resources thereon.

As used in this application, a "preparer," "user" or "taxpayer" includes, but is not limited to, a person preparing a tax return using tax return preparation software. The "preparer," "user" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's income tax burden, including information typically included in a tax return. The terms "tax data," as used in this application, also includes, but is not limited to, partially or fully completed tax forms (electronic and hard copy) that include information typically included in a tax return.

As used in this application, "computer," "computer device" and "computing device" include, but are not limited to, a computer (laptop or desktop) and a computer or computing device of a mobile communication device, smartphone and tablet computing device such as an IPAD (available from Apple Inc. of Cupertino, Calif.). As used in this application, "tax return preparation system," "tax return preparation computing device," "tax return preparation computer," "tax return preparation software," "tax return preparation module," "tax return preparation application," or "tax return preparation program" include, but are not limited to, one or more separate and independent software and/or hardware components of a computer that must be added to a general purpose computer before the computer can prepare tax returns, and computers having such components added thereto.

As used in this application, "client computer" includes, but is not limited to, one or more separate and independent software and/or hardware components of a computer that must be added to a general purpose computer before the computer can display a user interface for a web browser, and computers having such components added thereto. As used in this application, "browser server" but is not limited to, one or more separate and independent software and/or hardware components of a computer that must be added to a general purpose computer before the computer can host a portion of a web browser, and computers having such components added thereto.

As used in this application, "input/output module" includes, but is not limited to, one or more separate and independent software and/or hardware components of a computer that must be added to a general purpose computer before the computer can communicate with and facilitate the receipt and transfer of information, including interface and tax data, from and to other computers for tax data acquisition. As used in this application, "memory module" includes, but is not limited to, one or more separate and independent software and/or hardware components of a computer that must be added to a general purpose computer before the computer can store information, including interface and tax data, in proper formats for tax data acquisition. As used in this application, "user interface controller" includes, but is not limited to, one or more separate and independent software and/or hardware components of a computer that must be added to a general purpose computer before the computer can control a user interface for tax data acquisition. As used in this application, "rendering instruction generator" includes, but is not limited to, one or more separate and independent software and/or hardware components of a computer that must be added to a general purpose computer before the computer can process interface data to generate rendering instructions (e.g., for a display).

Figure 2:
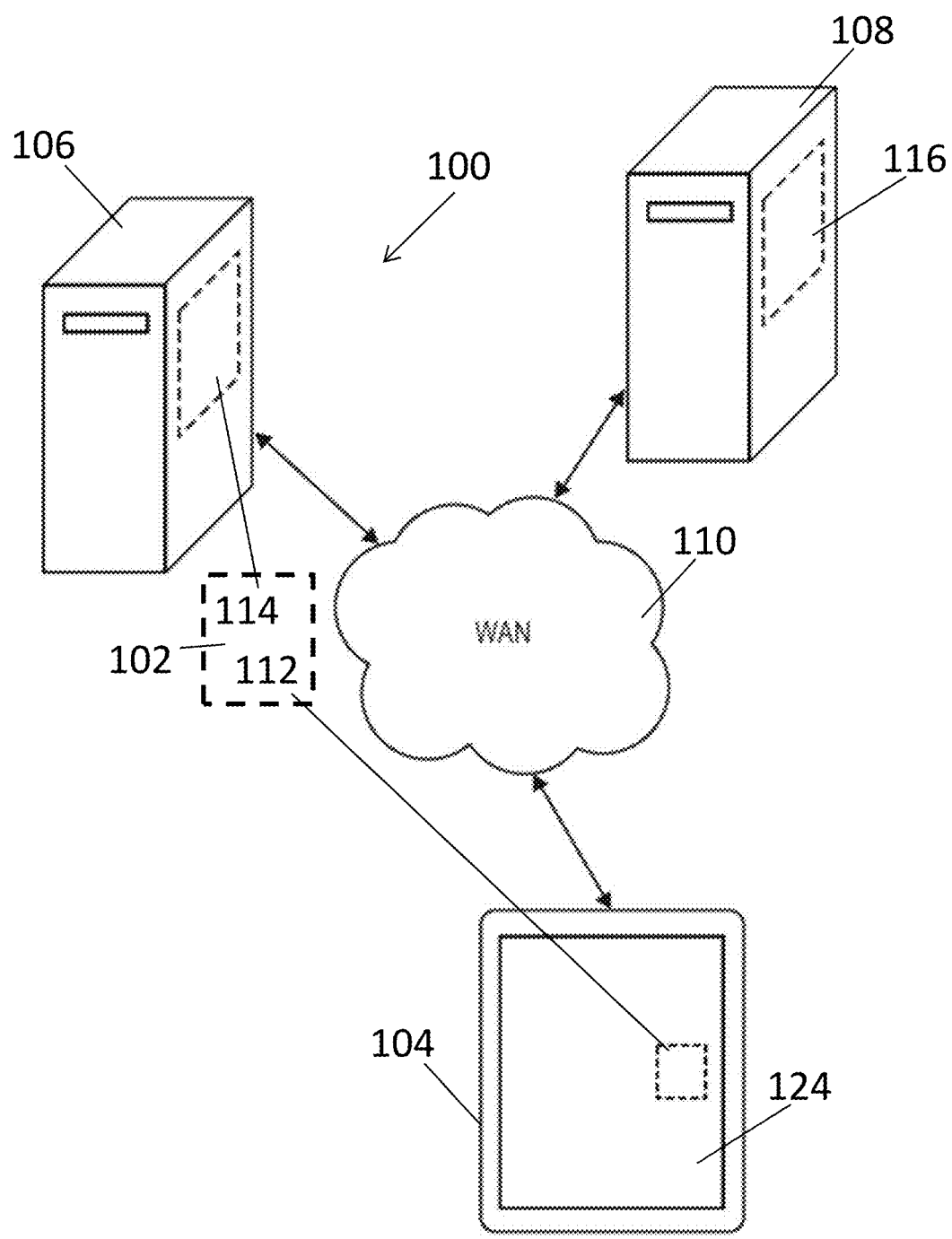

FIG. 1 depicts an exemplary hardware system 100 on which a tax data acquisition browser 102 according to one embodiment may be executed. The hardware system 100 according to this embodiment includes a client computer 104, a remote browser server computer 106, and a third party computer 108, all connected via a network 110 (e.g., a WAN network). The tax data acquisition browser 102 includes a user interface 112 running on the client computer 104 and a web engine 114 running on the browser server computer 106. The user interface 112 and the web engine 114 communicate with each other through the network 110. The third party computer 108 ("tax data computers") hosts a tax data source program 116, which communicates with the user interface 112 and/or the web engine 114 through the network 110. Examples of tax data source programs 116 include, but are not limited to, those associated with payroll processors, bank accounts, and investment accounts. The network 110 may be a wide area network, such as the Internet. The network 110 may also be a private communication network 110, such as a cellular data network. While FIG. 1 depicts the client computer 104 as a desktop computer, the client computer 104 can be any computing device, including a laptop computer or a computing device of a mobile communication device, smartphone or tablet computing device, as shown in FIG. 2. Embodiments in which the client computer 104 is a mobile communication device, smartphone or tablet computing device, the user interface 112 may be part of an application or a plug-in.

Figure 3:
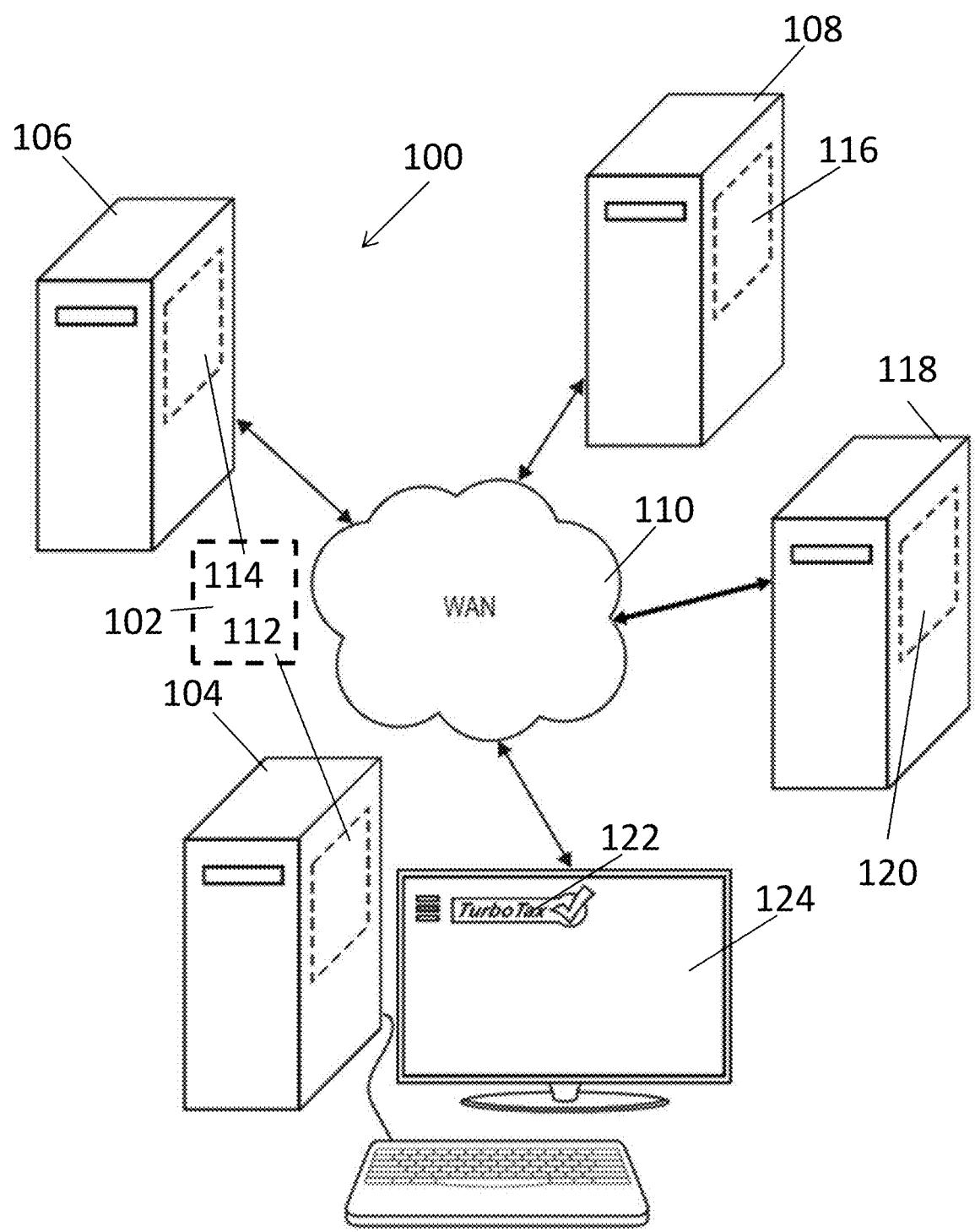
Figure 4:
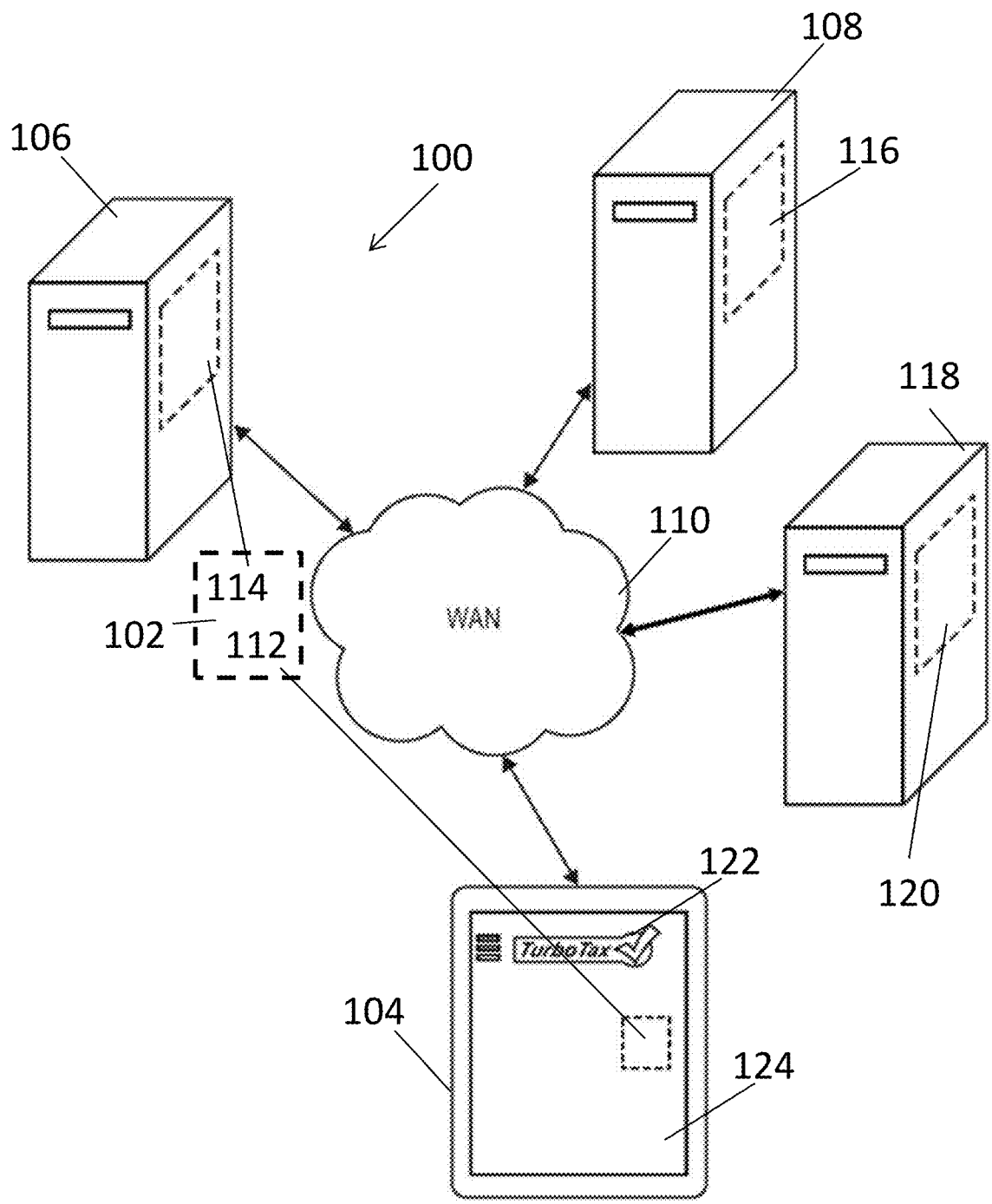

FIG. 3 depicts another exemplary hardware system 100 on which a tax data acquisition browser 102 according to one embodiment may be executed. The hardware system 100 according to this embodiment includes a client computer 104, a remote browser server computer 106, a third party computer 108, and a tax return preparation computer 118, all connected via a network 110 (e.g., a WAN network). The tax data acquisition browser 102 includes a user interface 112 running on the client computer 104 and a web engine 114 running on the browser server computer 106. The user interface 112 and the web engine 114 communicate with each other through the network 110. The third party computer 108 ("tax data computer") hosts a tax data source program 116, which communicates with the user interface 112 and/or the web engine 114 through the network 110. The tax return preparation computer 118 hosts a tax return preparation program 120, which communicates with the user interface 112 and/or the web engine 114 through the network 110. The tax return preparation program 120 is accessed via a tax return preparation web browser 122 on the client computer 104. The network 110 may be a wide area network, such as the Internet. The network 110 may also be a private communication network 110, such as a cellular data network. While FIG. 3 depicts the client computer 104 as a desktop computer, the client computer 104 can be any computing device, including a laptop computer or a computing device of a mobile communication device, smartphone or tablet computing device, as shown in FIG. 4. Embodiments in which the client computer 104 is a mobile communication device, smartphone or tablet computing device, the user interface 112 may be part of an application or a plug-in.

Examples of tax return preparation programs 120 that may be programmed to utilize tax data acquired by the tax data acquisition browser 102 according to embodiments include desktop or online versions of TURBOTAX, PROSERIES and LACERTE tax return preparation applications, available from Intuit Inc.; H&R BLOCK tax return preparation application available from H&R Block, Inc.; and TAXACT tax return preparation application available from TaxAct, Inc. TURBOTAX, PROSERIES AND LACERTE are registered trademarks of Intuit Inc., Mountain View, Calif. H&R BLOCK is a registered trademark of HRB Innovations, Inc., Las Vegas, Nev. TAXACT is a registered trademark of TaxAct, Inc., Cedar Rapids, Iowa. However, tax data acquisition browsers 102 according to the described embodiments are usable with all tax return preparation programs.

The tax return preparation computer 118 is specially or particularly configured or operable to host an on-line version of the tax return preparation program 120 and to store tax data. The tax return preparation computer 118 can also format and electronically file electronic tax returns with a computer of a tax authority. Examples of a tax authority or other tax collecting entity include a federal tax authority, e.g., the Internal Revenue Service (IRS), a state tax authority or other tax collecting entity of the United States, a state thereof, or another country or state thereof (generally, "tax authority"). Examples of hosts that provide the special purpose tax return preparation computer 118 include, for example, Intuit Inc., which provides a tax return preparation computer 118 or server of the Intuit Electronic Filing Center for electronically filing tax returns and other hosts that provide tax return preparation programs 120 and electronic filing servers.

In some embodiments, a plurality of users may each physically interface with respective ones of the tax return preparation computing devices 102 (not shown). In various embodiments, the tax return preparation program 120 may reside on the client computer 104 or, alternatively, the tax return preparation program 120 may reside on a remote tax return preparation computer 118 connected to the client computer 104 via the network 110, as illustrated in FIGS. 3 and 4. The tax return preparation program 120, whether residing on the client computer 104 or the tax return preparation computer 118, may be accessed via a tax return preparation web browser 122 on the client computer 104. While the tax data acquisition browsers 102 depicted in FIGS. 1 to 4 run on a client computer 104 and a browser server computer 106, in other embodiments the tax data acquisition browsers 102 may also run on one or more other computing devices connected to the hardware system 100. The various client computers 104 may include visual displays or screens 124 operatively coupled thereto.

Each of the networks 110 discussed herein (generally, network 110) may be two or more different but interconnected networks depending on the system configuration and communication protocols employed. The network 110 may be, for example, a wireless or cellular network, a Local Area Network (LAN) and/or a Wide Area Network (WAN). Reference to network 110 generally is not intended to refer to a specific network or communications protocol, and embodiments can be implemented using various networks and combinations thereof.

Figure 5:
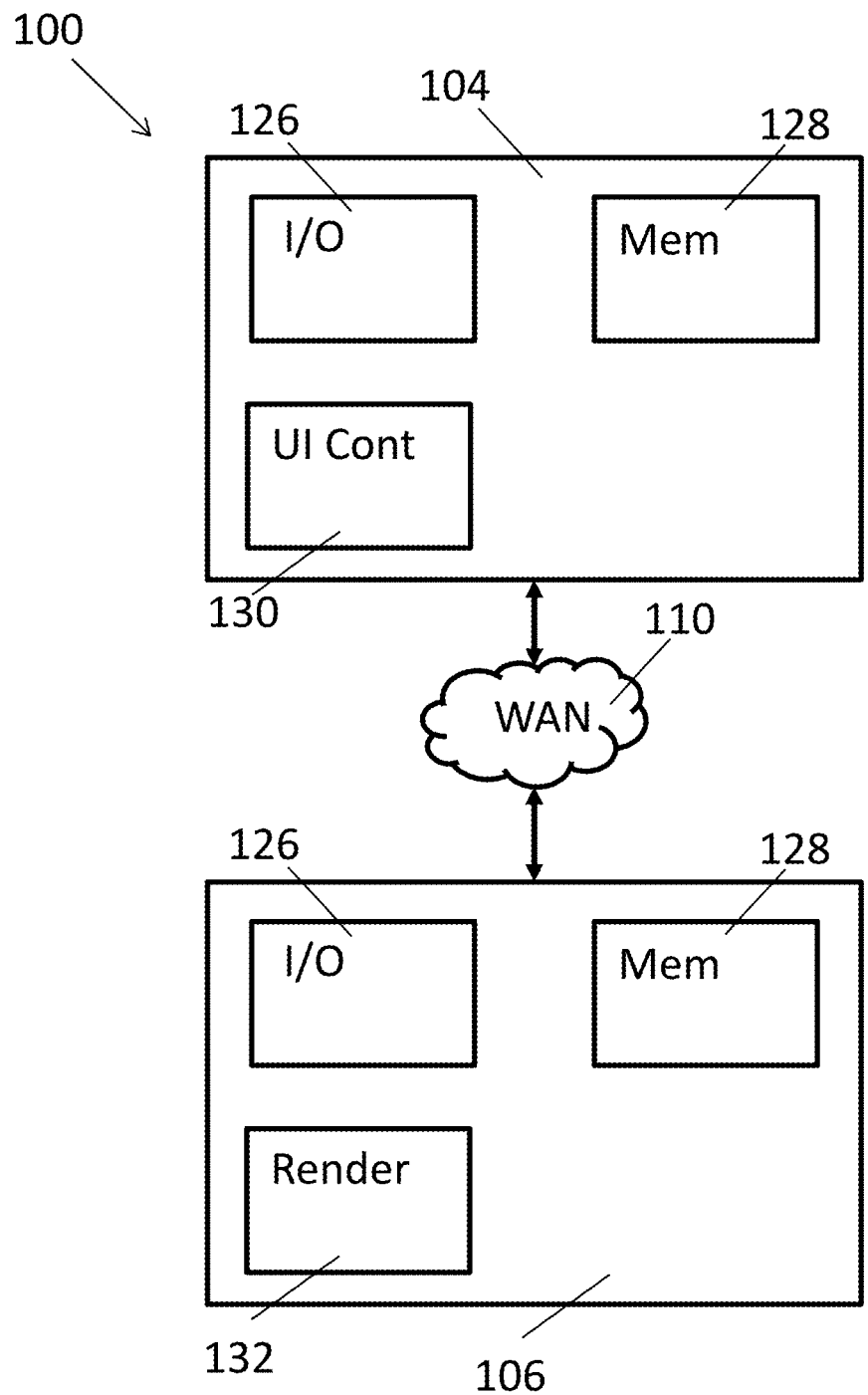
FIG. 5 is a block diagram of a computer system according to one embodiment on which a tax data acquisition browser may be implemented.

FIG. 5 depicts, in greater detail, another hardware system 100 configured to host a tax data acquisition browser 102 according to one embodiment. Like the systems 100 depicted in FIGS. 1-4, the system 100 in FIG. 5 includes a client computer 104 and a browser server computer 106 connected by a network 110. The client computer 104 includes an input/output module 126, a memory module 128, and a user interface controller 130. The browser server computer 106 includes an input/output module 126, a memory module 128, and a rendering instruction generator 132. The input/output modules 126 are configured to communicate with and facilitate the receipt and transfer of information, including interface and tax data, from and to various computers (e.g., client computer 104, server browser 106, third party computer 108, and tax return preparation computer 118) for tax data acquisition. The memory modules 128 are configured to store information, including interface and tax data, in proper formats for tax data acquisition. The user interface controllers 130 are configured to control a user interface for tax data acquisition (e.g., via user input interface elements and displaying rendering). The rendering instruction generator 132 is configured to process interface data to generate rendering instructions (e.g., for a display 124).

FIGS. 1-5 illustrate the tax data acquisition browser 102 as being hosted (in parts) on client computer 104 and browser server computer 106, but in other embodiments, both parts of the tax data acquisition browser 102 may be hosted on the same computer (e.g., a user computer). Further, while FIGS. 3 and 4 illustrate user interface 112 of the tax data acquisition browser 102 and the tax return web browser 122 as being displayed on the same client computer 104, these browsers may be displayed on different computers that are operatively coupled by a network 110.

In the embodiments depicted in FIGS. 3 and 4, the tax return preparation program 120 is an on-line tax return preparation program hosted by a tax return preparation computer 118 and accessed by client computer 104 using a tax return preparation web browser 122, but embodiments may also involve a local tax return preparation program that executes on client computer 104, which may also be access using a tax return preparation web browser 122. For ease of explanation, reference is made generally to tax return preparation program 120.

Figure 6:
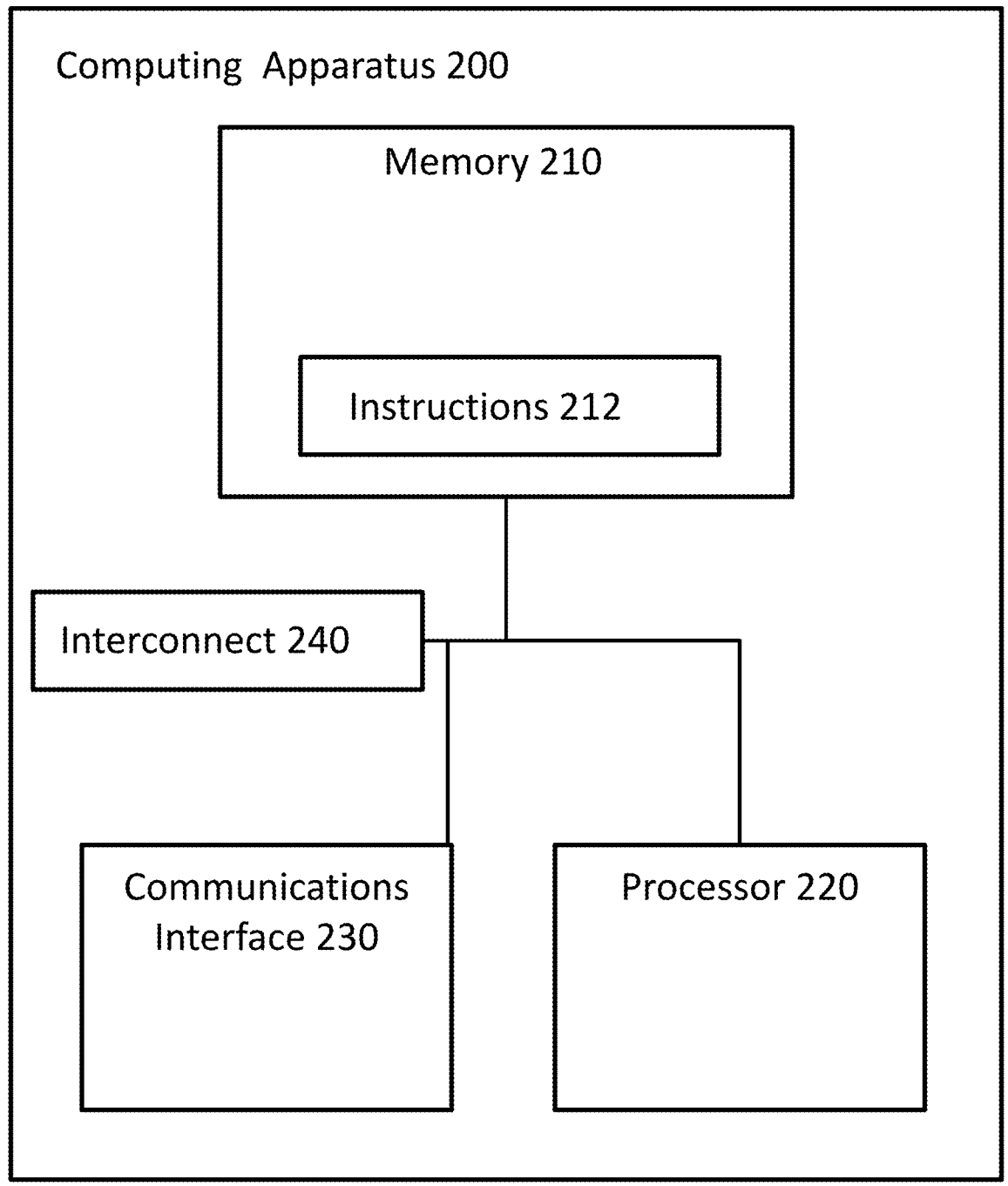
FIG. 6 is a block diagram of a computing apparatus or system in which various embodiments may be implemented or that may be utilized to execute various embodiments.

FIG. 6 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 6 is provided to generally illustrate how embodiments may be configured and implemented. The processor units 220 in the client computer 104, browser server computer 104, third party computer 108, and tax return preparation computer 118 are programmed with respective user interface 112, web engine 114, tax data source program 116, and tax return preparation program 120.

Figure 7:
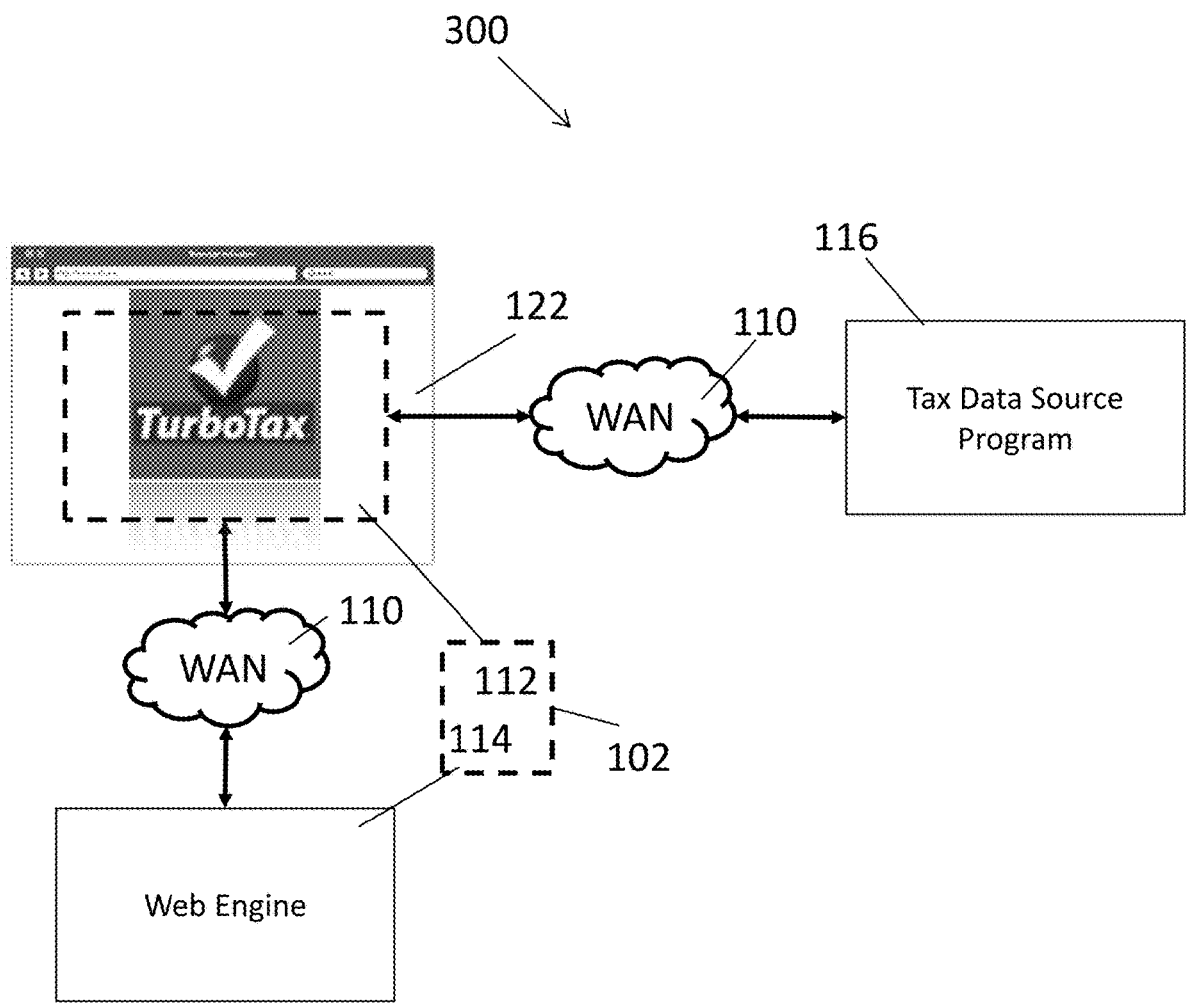
FIGS. 7 and 8 are block diagrams of tax data acquisition browsers according to two embodiments.

FIG. 7 depicts a software system 300 including software components of the tax data acquisition browser 102 according to one embodiment. The tax data acquisition browser 102 includes a user interface 112 and a web engine 114. The user interface 112 may be hosted on a client computer 104 (see FIGS. 1-4). The web engine 114 may be hosted on a browser server computer 106 (see FIGS. 1-4). The system 300 also includes a tax return preparation web browser 122, which may be hosted on the client computer 104 (see FIGS. 3 and 4). The tax return preparation web browser 122 may be operatively coupled to a tax return preparation program 120 hosted on a tax return preparation computer 118 (not shown in FIG. 7, but see FIGS. 3 and 4). The user interface 112 of the tax data acquisition browser 102 is overlaid on top of the tax return preparation web browser 122. In some embodiments, the user interface 112 is rendered in a modal window such that the tax return preparation web browser 122 remains open, but is inaccessible, until the modal window is closed.

The user interface 112 and the web engine 114 are communicatively coupled by a network 110 (e.g., a WAN network). The tax data acquisition browser 102 is also communicatively coupled to a tax data source program 116. In the embodiment depicted in FIG. 7, the user interface 112, but not the web engine 114, is directly communicatively coupled to the tax data source program 116. In such an embodiment, the coupling of the user interface 112 and the web engine 114 may not be detectable by the tax data source program 116. In other words, interactions between the user interface 112 and the web engine 114, including transmission of tax data received from the tax data source program 116 may be invisible to the tax data source program 116. While the web engine 114 and the tax data source program 116 are communicatively coupled to the user interface 112 by the two networks 110, these components of the software system 300 may be communicatively coupled to each other by the same network 110 (as shown in FIGS. 1-5). In such embodiments, the user interface 112 and the web engine 114 may be programmed such that one or both of these components communicate with the tax data source program 116.

Figure 8:
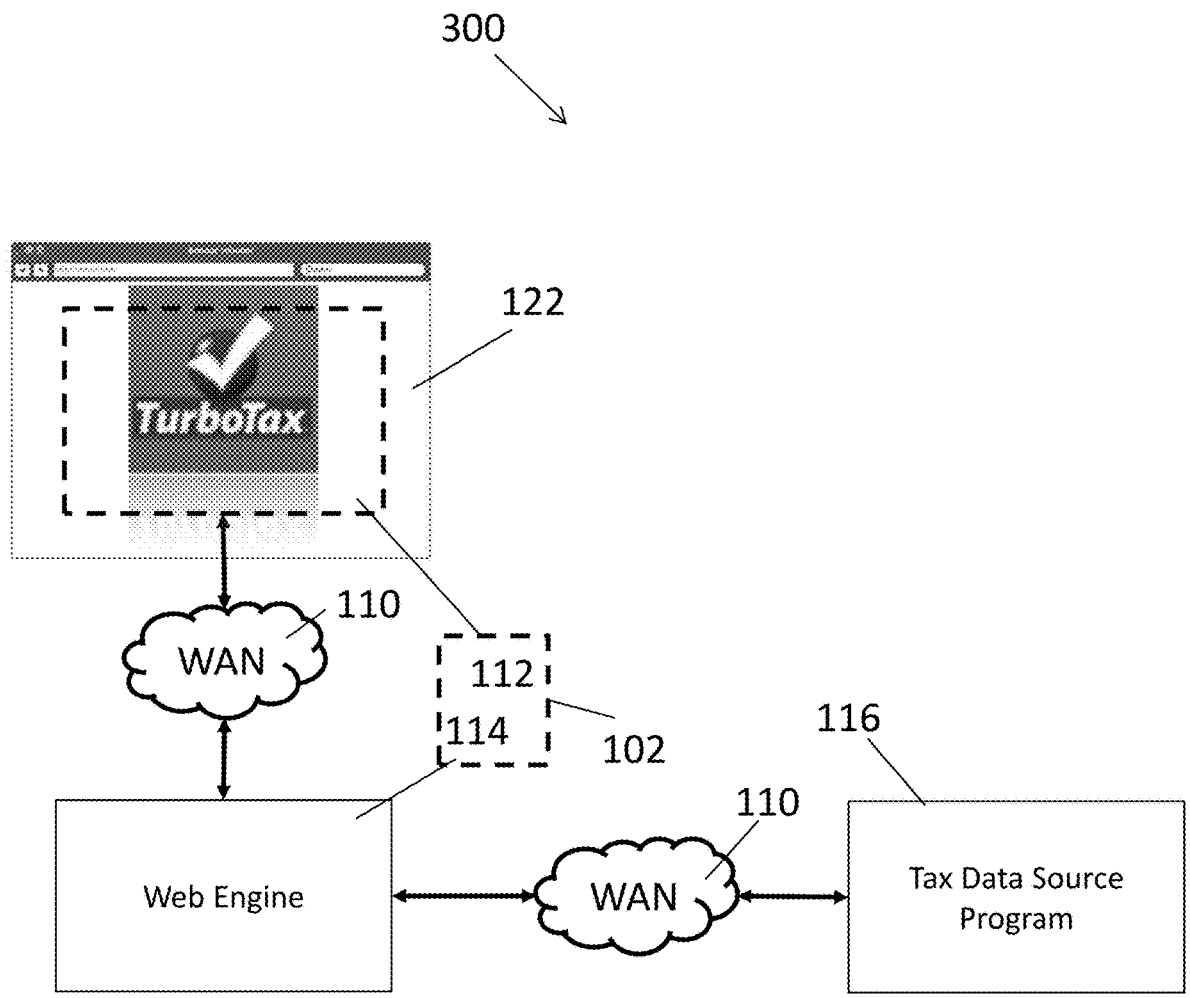

FIG. 8 depicts a software system 300 including software components of the tax data acquisition browser 102 according to one embodiment. The tax data acquisition browser 102 includes a user interface 112 and a web engine 114. The user interface 112 may be hosted on a client computer 104 (see FIGS. 1-4). The web engine 114 may be hosted on a browser server computer 106 (see FIGS. 1-4). The system 300 also includes a tax return preparation web browser 122, which may be hosted on the client computer 104 (see FIGS. 3 and 4). The tax return preparation web browser 122 may be operatively coupled to a tax return preparation program 120 hosted on a tax return preparation computer 118 (not shown in FIG. 8, but see FIGS. 3 and 4). The user interface 112 of the tax data acquisition browser 102 is overlaid on top of the tax return preparation web browser 122. In some embodiments, the user interface 112 is rendered in a modal window such that the tax return preparation web browser 122 remains open, but is inaccessible, until the modal window is closed.

The user interface 112 and the web engine 114 are communicatively coupled by a network 110 (e.g., a WAN network). The tax data acquisition browser 102 is also communicatively coupled to a tax data source program 116. In the embodiment depicted in FIG. 8, the web engine 114, but not the user interface 112, is directly communicatively coupled to the tax data source program 116. In such an embodiment, the coupling of the user interface 112 and the web engine 114 may not be detectable by the tax data source program 116. In other words, interactions between the user interface 112 and the web engine 114, including transmission of tax data received from the tax data source program 116 may be invisible to the tax data source program 116. While the user interface 112 and the tax data source program 116 are communicatively coupled to the web engine 114 by the two networks 110, these components of the software system 300 may be communicatively coupled to each other by the same network 110 (as shown in FIGS. 1-5). In such embodiments, the user interface 112 and the web engine 114 may be programmed such that one or both of these components communicate with the tax data source program 116.

Figure 9:
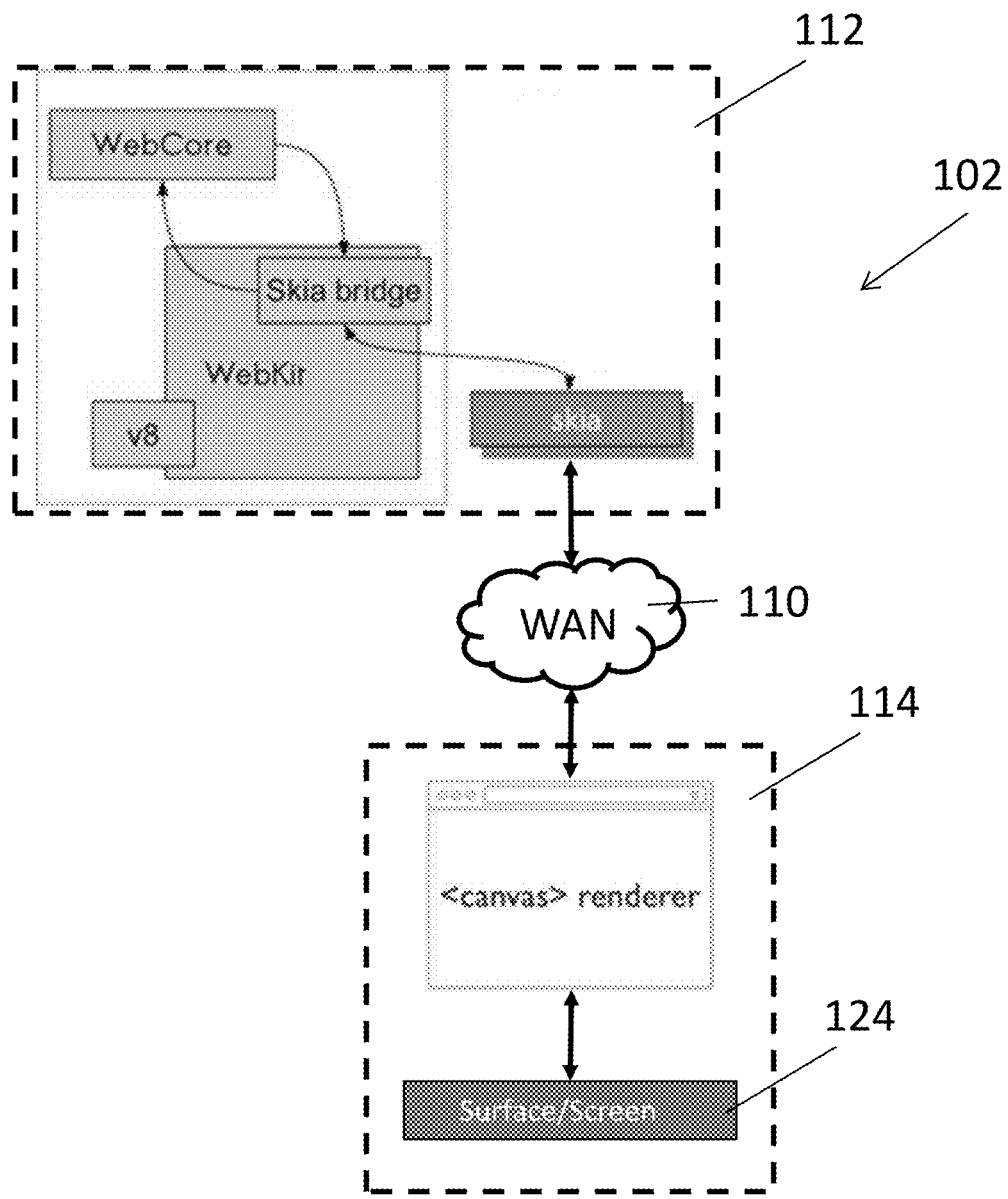
FIG. 9 is a block diagram of a software system for implementation of a tax data acquisition browser according to one embodiment.

FIG. 9 depicts an embodiment of a tax data acquisition browser 102, including several open source components or modules that may be included in the tax data acquisition browser 102 that illustrates the rendering pipeline. The identification of these exemplary system components is illustrative and not intended to be limiting. The tax data acquisition browser 102 includes a user interface 112 and a web engine 114. A version of WebKit that may be used to execute the web engine 114 includes the following components or modules. WebCore, is a part of a client side API for WebKit. V8 is the JavaScript engine. The web engine 114 also includes Skia, which is a vector graphics library. Skia Bridge facilitates communication between Skia and the other components of the web engine 114.

The user interface 112 includes Canvas Renderer, which takes rendering instructions and draws images on a screen 124 according to those instructions. The web engine 114 and the user interface 112 are communicatively coupled by a network 110, which is configured to transmit rendering instructions.

In operation, Webkit processes/transforms webpage computations, including those needed for JavaScript, Cascading Style Sheets ("CSS") and HTML, into vector graphics instructions, which are sent to the Skia library. In turn, Skia processes/transforms the vector graphic instructions into rendering instructions for drawing a webpage onto a display surface. The display surface can be any real or virtual surface upon which a webpage can be rendered, including, but not limited to, a computer screen 124, a mobile device screen 124, or a PDF file. The rendering instructions are transmitted serially to the Canvas Renderer in the user interface 114 over the network 110. Finally, the Canvas Renderer draws an image (e.g., in a browser) on the screen 124.

Figure 10:
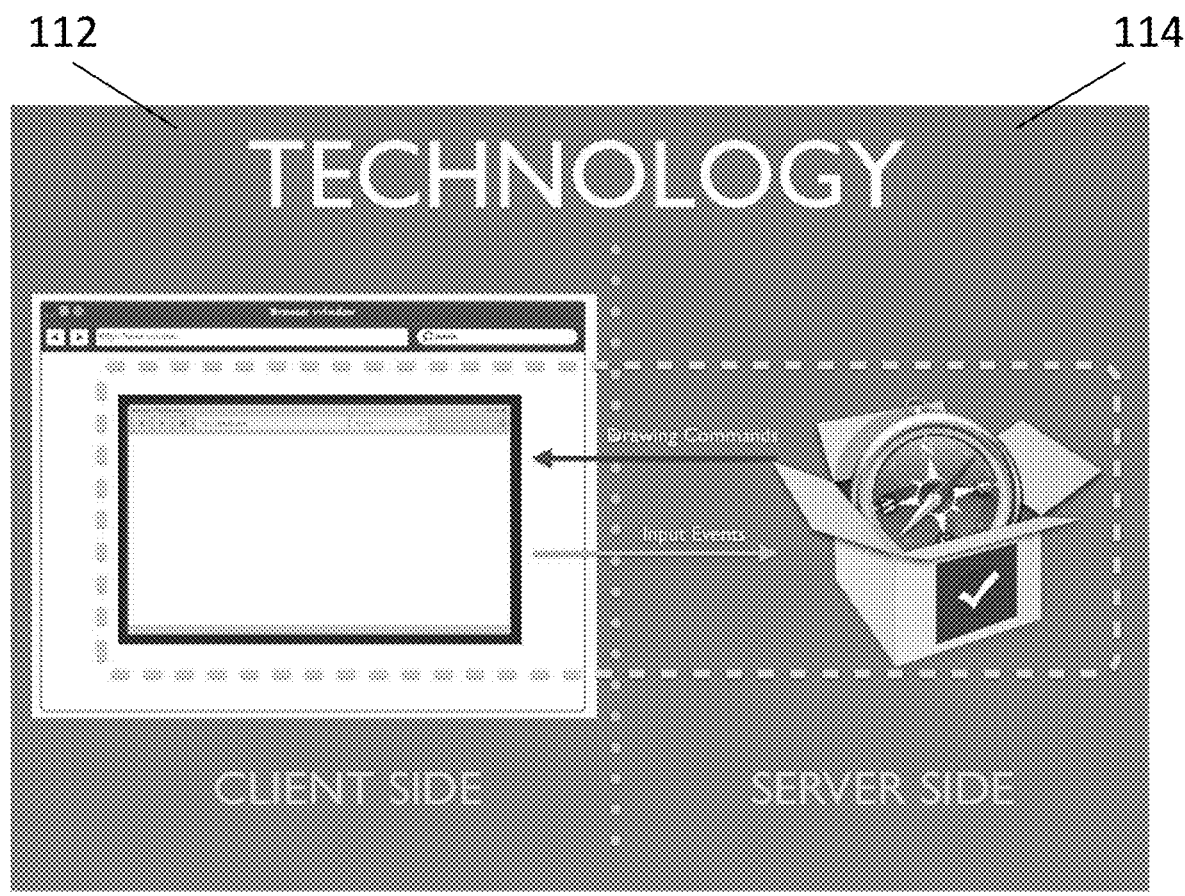
FIG. 10 is a block diagram illustrating the flow of data in a tax data acquisition browser according to one embodiment.

FIG. 10 illustrates one embodiment of the data flow between the user interface 112 running on the client computer 104 and the web engine 114 running on the browser server computer 106. Data from input events (from a user input and/or a tax data source program 116) are transmitted from the user interface 112 to the web engine 114. Data in the form of rendering instructions (i.e., drawing commands) are transmitted from the web engine 114 to the user interface 112.

Figure 11:
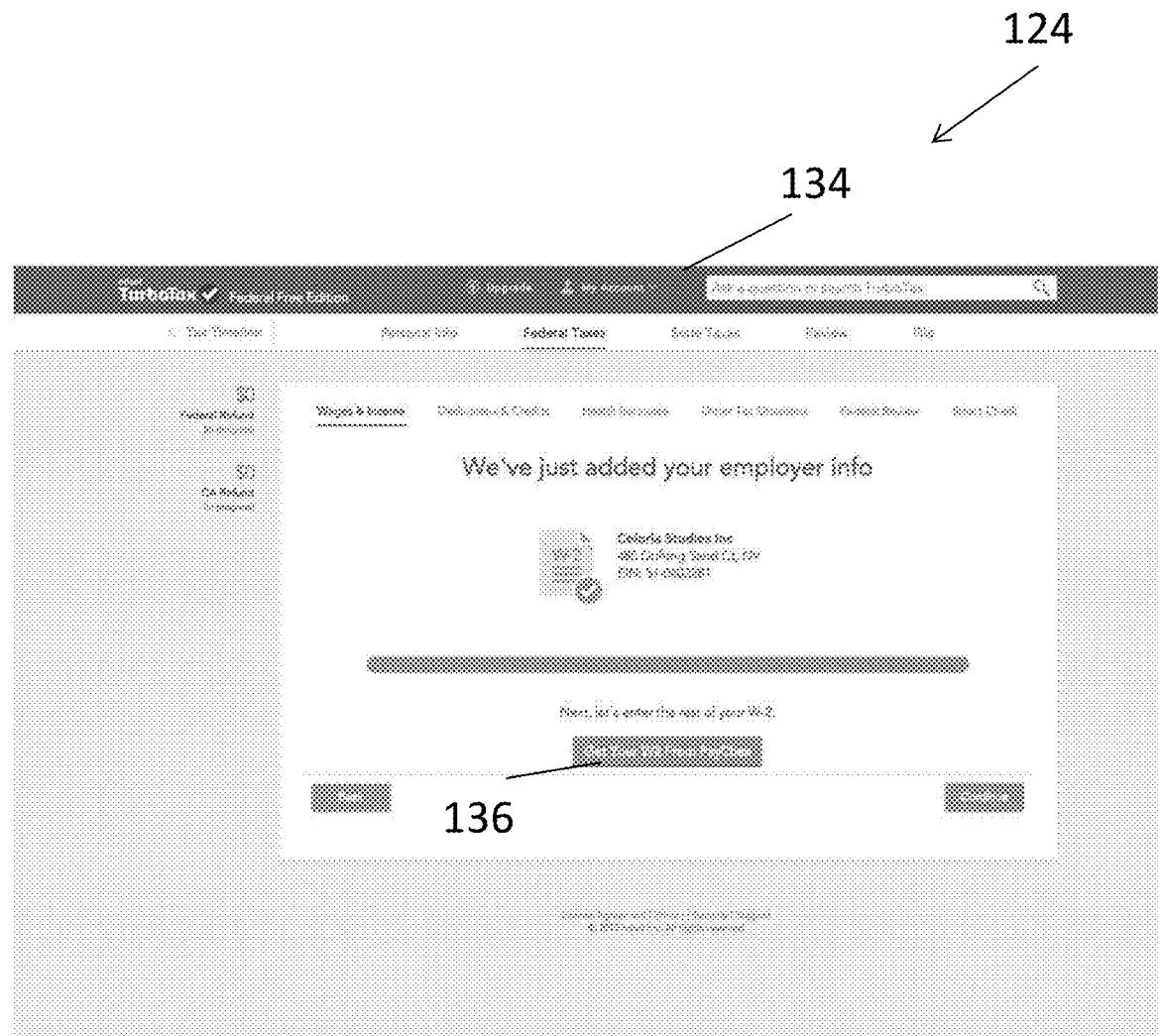
FIGS. 11 to 14 are exemplary screen shots of a tax data acquisition browser according to one embodiment.

FIG. 11 depicts a screen 124 (e.g., of a client computer 104) displaying a tax return preparation web browser 122 of a tax return preparation program 120. The tax return preparation web browser 122 is displayed in a primary webpage 134. The tax return preparation web browser 122 includes a user interface object 136 configured to open a secondary webpage 138 displaying a tax data source program 116. In this embodiment, the tax data source program 116 is a payroll processor (e.g., PAYCHEX). The user interface object 136 includes indicia of the tax data source program 116, for which it is configured to facilitate access.

Figure 12:
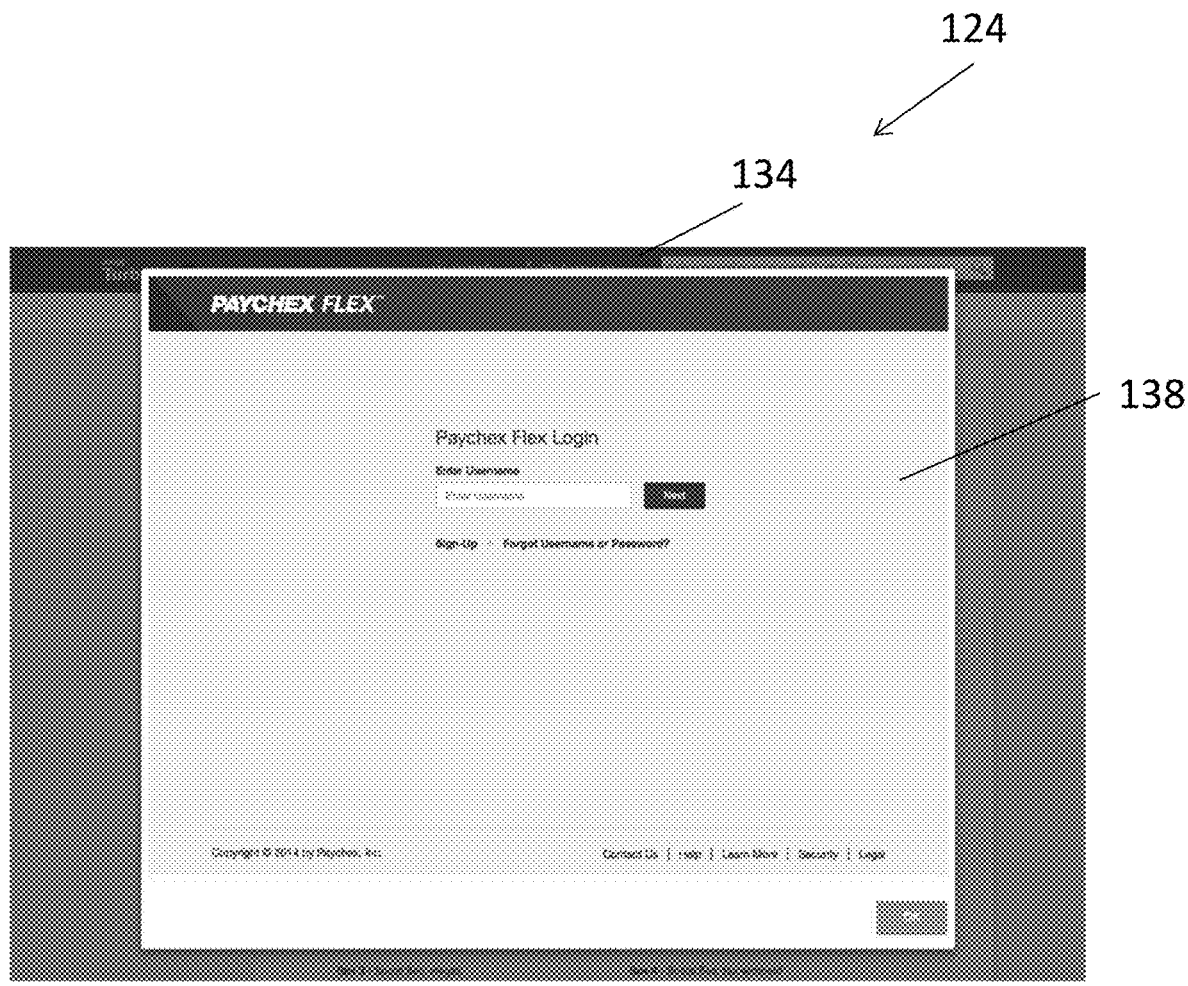

FIG. 12 depicts the screen 124 after a user selects the user interface object 136. The screen 124 displays the secondary webpage 138 (showing the tax data source program 116, i.e., a "tax data webpage") overlaying the primary webpage 134 (showing the tax return preparation web browser 122). In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 12 displays a first login screen for the tax data source program 116 configured for entry of a Username.

Figure 13:
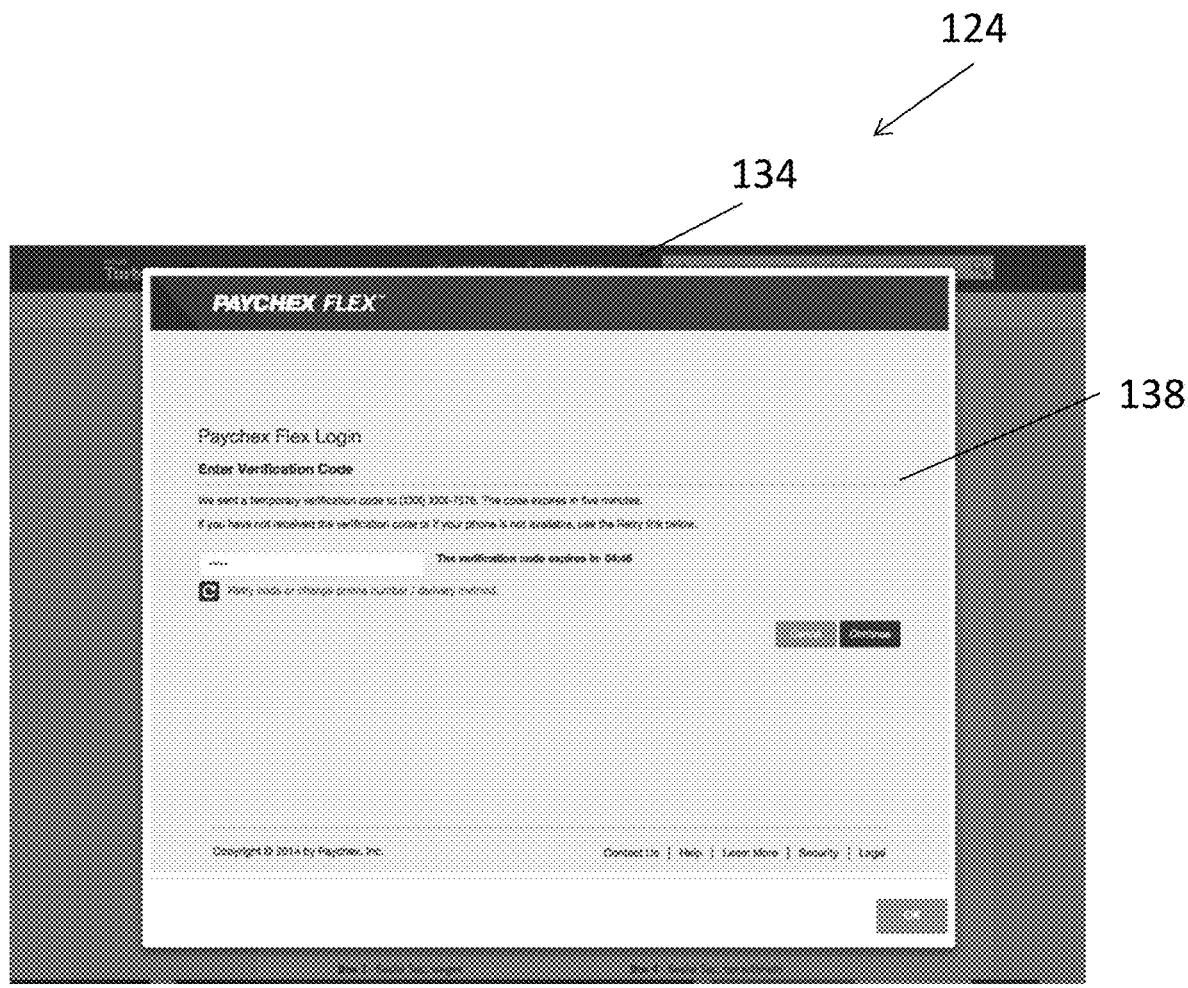

FIG. 13 depicts the screen 124 after the user enters the Username. The secondary webpage 138 in FIG. 13 displays a second login screen for the tax data source program 116 configured for entry of a Verification Code. The primary webpage 134 remains open, but shaded and inaccessible.

Figure 14:
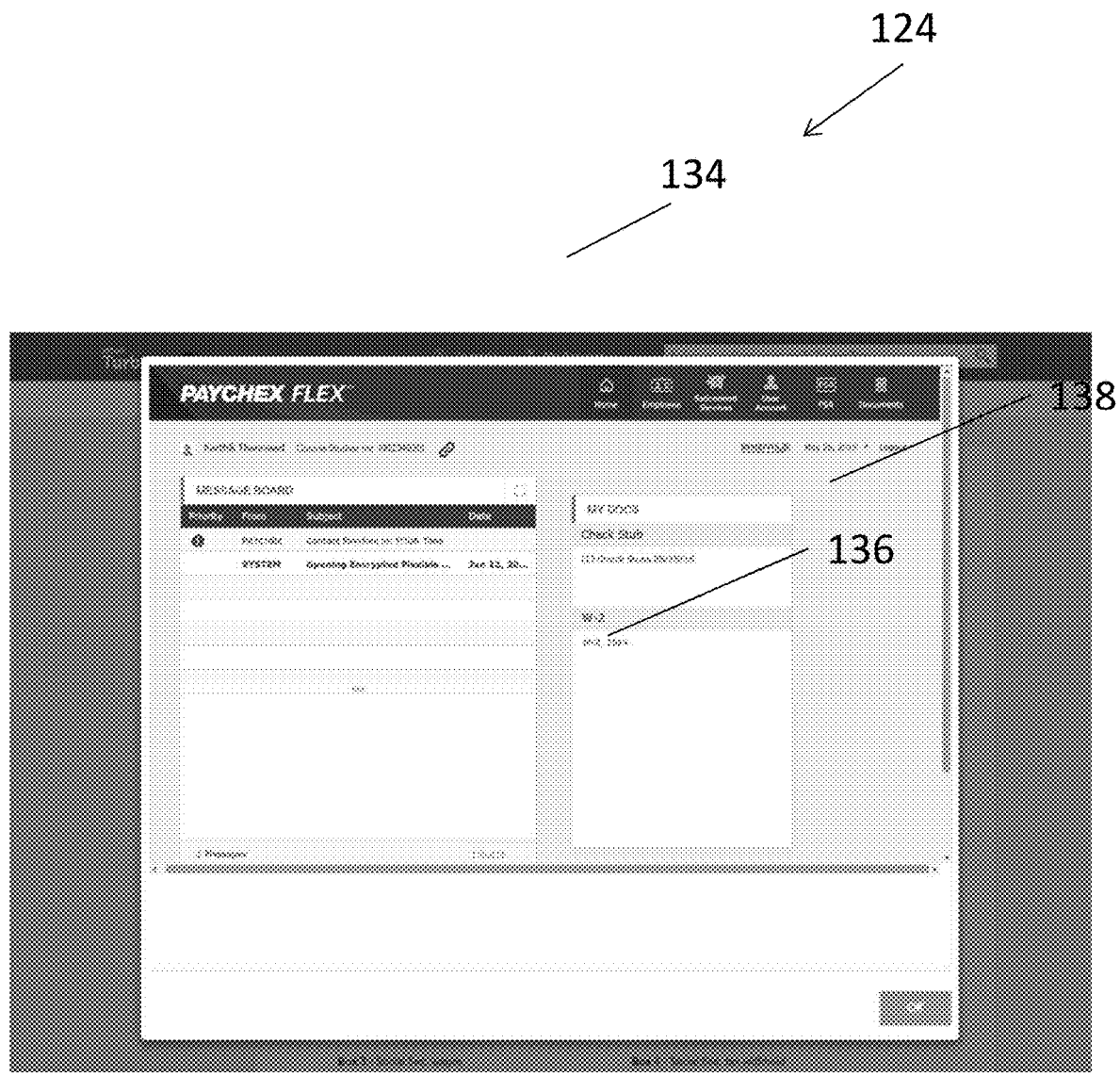

FIG. 14 depicts the screen 124 after the user enters the Verification Code and logs into the tax data source program 116. The secondary webpage 138 in FIG. 14 emulates a home screen for the tax data source program 116. The secondary webpage 138 includes a user interface object 136 configured to download tax data in for form of a W-2 form (in PDF format). The primary webpage 134 remains open, but shaded and inaccessible.

While the secondary webpages 138 in FIGS. 12-14 display only webpages rendered according to instructions from the tax data source program 116, the tax data acquisition browser 102 may also display annotation user interface objects overlaid on top of the tax data source program webpages. For instance, an annotation user interface object may be an arrow and/or text directing a user to select a user interface object from a tax data source program webpage to acquire tax data. The tax data acquisition browser 102 may also display download authorization user interface objects configured to allow a user to authorize download of tax data from the user interface 112 (e.g., to the web engine 114). While the secondary webpages 138 are displayed in modal windows in FIGS. 12-14, the secondary webpages 138 may be side-by-side windows, such that a user can manually switch between active windows.

Having described various aspects of tax data acquisition browsers 102 according to various embodiments, computer-implemented methods for acquiring tax data using the tax data acquisition browsers 102 will now be described.

Figure 15:
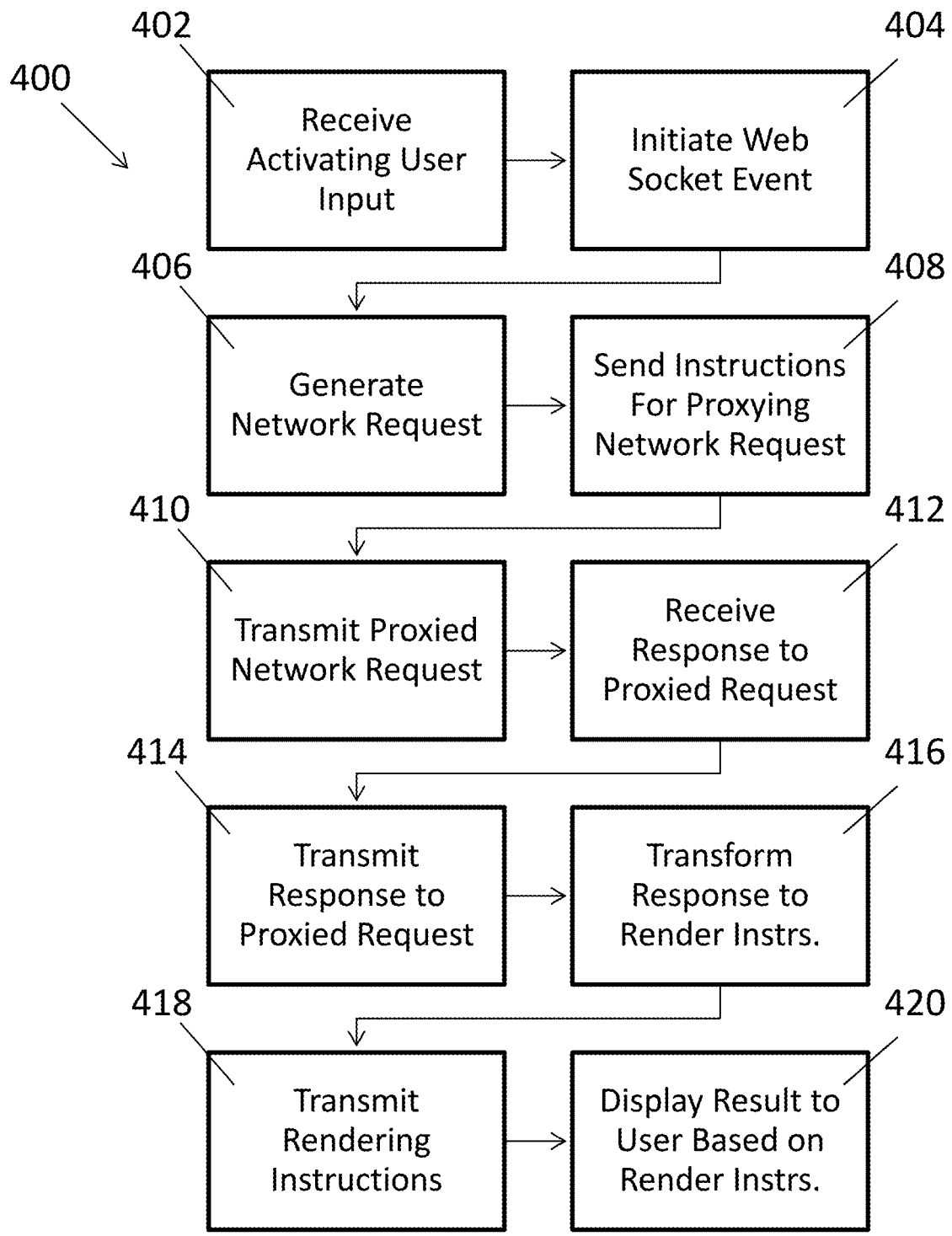
FIGS. 15 to 18 are flow charts depicting computer implemented methods of acquiring tax data according to various embodiments.

FIG. 15 depicts a computer-implemented method 400 executed according to one embodiment by a system 100, 300 including a tax data acquisition browser 102 and a tax data source program 116, as shown in FIGS. 1 and 7. The tax data acquisition browser 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The user interface 112 and the web engine 114 are communicatively coupled by a network 110. Further, the user interface 112 and the tax data source program 116 are communicatively coupled by the network 110.

At step 402, the system 100, 300 receives user input activating the tax data acquisition browser 102. For instance, the activating user input may be selection of a user interface object 136 as shown in FIG. 11. The user interface object 136 may be part of a primary webpage 136 displaying a tax return preparation web browser 122 of a tax return preparation program 120.

At step 404, the user interface 112 initiates a web socket event to the web engine 114 via the network 110 in response to the activating user input. At step 406, the web engine 114 generates a network request based on the web socket event. For example, the network request may be an HTML or a CCS request resulting in the login screen in FIG. 12. At step 408, the web engine 114 transmits instructions for proxying the network request to the user interface 112.

At step 410, the user interface 112 transmits the proxied network request to the tax data source program 116 via the network 110. Examples of tax data source programs 116 include, but are not limited to, those associated with payroll processors (as in FIG. 12), bank accounts, and investment accounts. At step 412, the user interface 112 receives a response to the proxied network request from the tax data source program 116 via the network 110. The response may be interface data including HTML code describing the content and format of a webpage to be displayed (e.g., the webpage 138 in FIG. 12).

At step 414, the user interface 112 transmits the proxied request response to the web engine 114 via the network 110. At step 416, the web engine 114 processes the proxied request response to render a next webpage or sequence by generating rendering instructions. At step 418, the web engine 114 transmits the rendering instructions to the user interface 112 via the network 110. At step 420, the user interface 112 displays the result of the proxied request response based on the rendering instructions.

In the method 400 depicted in FIG. 15, the coupling of the user interface 112 and the web engine 114 may not be detectable by the tax data source program 116. In other words, interactions between the user interface 112 and the web engine 114 may be invisible to the tax data source program 116.

Figure 16:
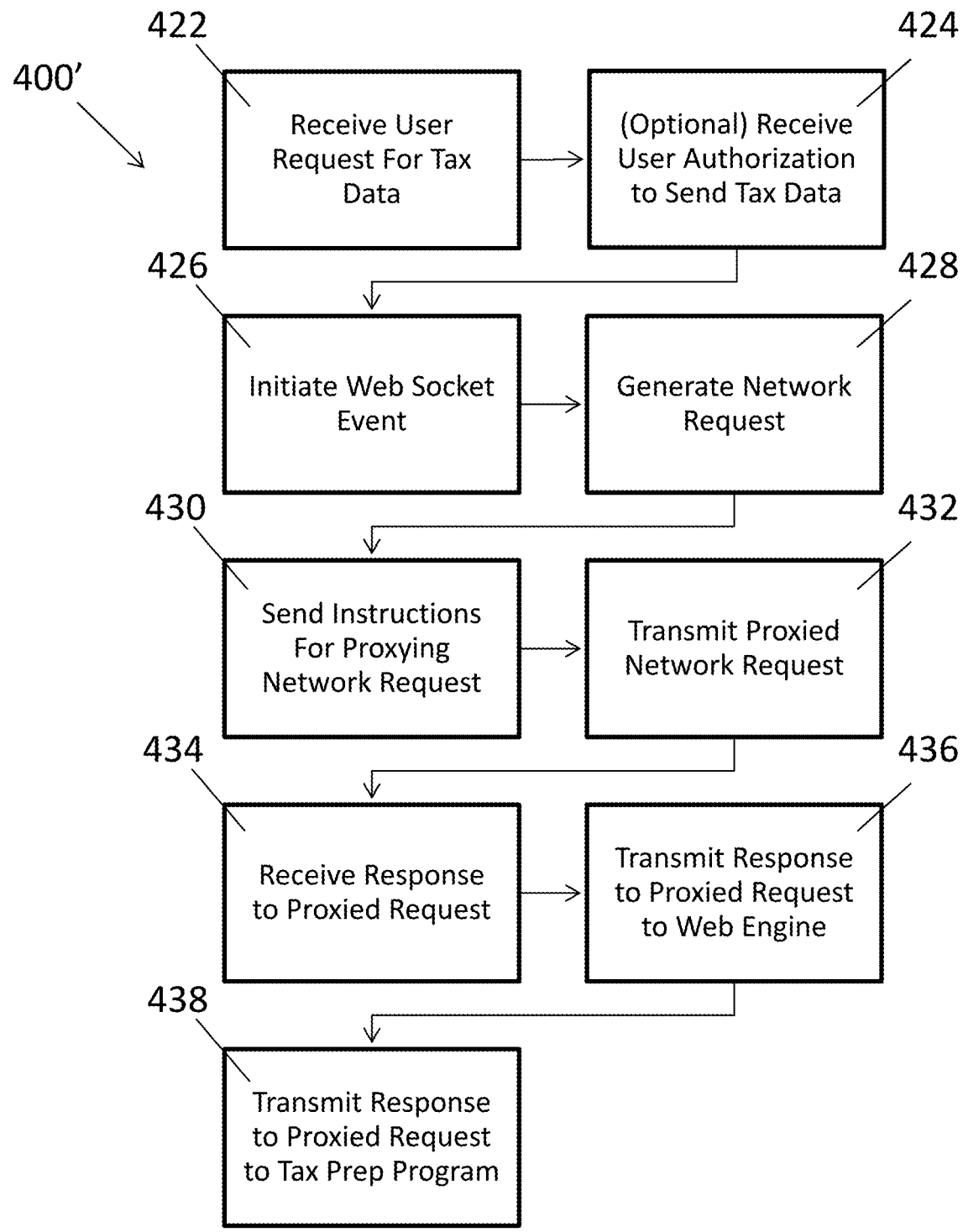

FIG. 16 depicts a computer-implemented method 400' executed according to one embodiment by a system 100, 300 including a tax data acquisition browser 102, a tax data source program 116, and a tax return preparation program 116, as shown in FIGS. 3 and 7. The tax data acquisition browser 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The tax return preparation program 116 runs on a tax return preparation computer 118. The user interface 112 and the web engine 114 are communicatively coupled by a network 110. Further, the user interface 112 and the tax data source program 116 are communicatively coupled by the network 110. Moreover, the web engine 114 and the tax return preparation program 116 are communicatively coupled by the network 110.

At step 422, the system 100, 300 receives a user request for tax data. For instance, the user request may be selection of a user interface object 136 associated with tax data (a W-2 form as shown in FIG. 14). The user interface object 136 may be part of a secondary webpage 138 emulating a webpage of a tax data source program 116. Annotating user interface objects (not shown) may be overlaid on top of the secondary webpage 138 to guide a user to the user interface object 136 associated with the tax data. This method leverages the user's navigation of the tax data source program 116 to for the system 100, 300 to "learn" the steps needed to acquire the tax data. Accordingly, these user commands may also be sent to a tax return preparation program 120 for storage with user authorization.

At step 424, the system 100, 300 optionally requests and receives user authorization to send the tax data to the tax return preparation program 116. User authorization provided at this point in the process typically only applies to the tax data associated with the user interface object 136. User authorization may not be required at this point in the process (e.g., if user authorization for a general class of tax data was previously provided).

At step 426, the user interface 112 initiates a web socket event to the web engine 114 via the network 110 in response to the user tax data request. At step 428, the web engine 114 generates a network request based on the web socket event. For example, the network request may be an HTML or a CCS request resulting downloading of a W-2 form (e.g., in PDF format). At step 430, the web engine 114 transmits instructions for proxying the network request to the user interface 112.

At step 432, the user interface 112 transmits the proxied network request to the tax data source program 116 via the network 110. Examples of tax data source programs 116 include, but are not limited to, those associated with payroll processors (as in FIG. 12), bank accounts, and investment accounts. At step 434, the user interface 112 receives a response to the proxied network request from the tax data source program 116 via the network 110. The response may be tax data (e.g., a PDF of a W-2 form).

At step 436, the user interface 112 transmits the proxied request response (e.g., the W-2 form) to the web engine 114 via the network 110. At step 438, the web engine 114 transmits the proxied request response (e.g., the W-2 form) to the tax return preparation program 120.

In the method 400' depicted in FIG. 16, the coupling of the user interface 112, the web engine 114, and the tax return preparation program 120 may not be detectable by the tax data source program 116. In other words, interactions between the user interface 112, the web engine 114, and the tax return preparation program 120 may be invisible to the tax data source program 116.

Figure 17:
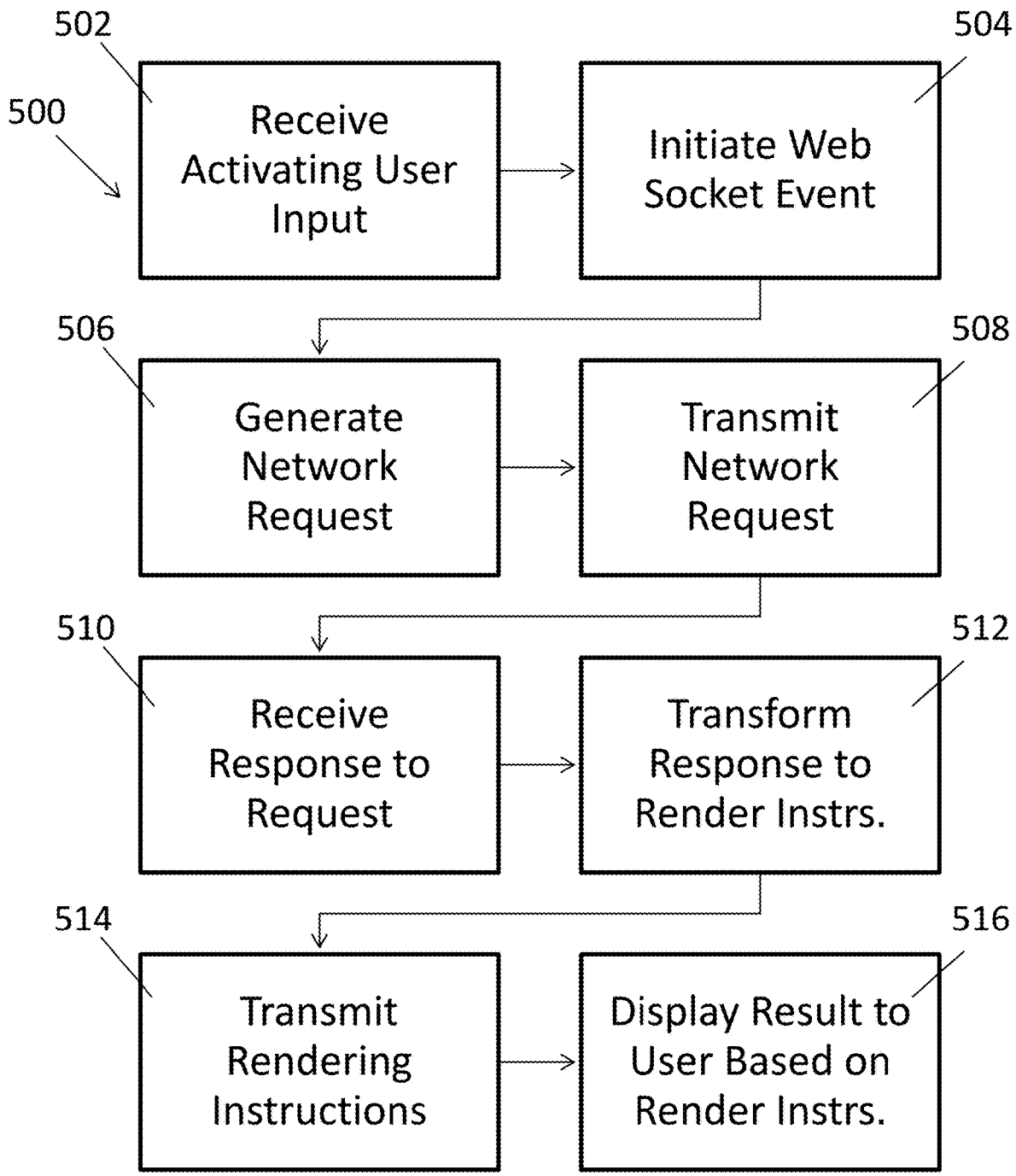

FIG. 17 depicts a computer-implemented method 500 executed according to one embodiment by a system 100, 300 including a tax data acquisition browser 102 and a tax data source program 116, as shown in FIGS. 1 and 8. The tax data acquisition browser 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The user interface 112 and the web engine 114 are communicatively coupled by a network 110. Further, the web engine 114 and the tax data source program 116 are communicatively coupled by the network 110.

At step 502, the system 100, 300 receives user input activating the tax data acquisition browser 102. For instance, the activating user input may be selection of a user interface object 136 as shown in FIG. 11. The user interface object 136 may be part of a primary webpage 136 displaying a tax return preparation web browser 122 of a tax return preparation program 120.

At step 504, the user interface 112 initiates a web socket event to the web engine 114 via the network 110 in response to the activating user input. At step 506, the web engine 114 generates a network request based on the web socket event. For example, the network request may be an HTML or a CCS request resulting in the login screen in FIG. 12.

At step 508, the web engine 114 transmits the network request to the tax data source program 116 via the network 110. Examples of tax data source programs 116 include, but are not limited to, those associated with payroll processors (as in FIG. 12), bank accounts, and investment accounts. At step 510, the web engine 114 receives a response to the network request from the tax data source program 116 via the network 110. The response may be interface data including HTML code describing the content and format of a webpage to be displayed (e.g., the webpage 138 in FIG. 12).

At step 512, the web engine 114 processes the request response to render a next webpage or sequence by generating rendering instructions. At step 514, the web engine 114 transmits the rendering instructions to the user interface 112 via the network 110. At step 516, the user interface 112 displays the result of the request response based on the rendering instructions.

Figure 18:
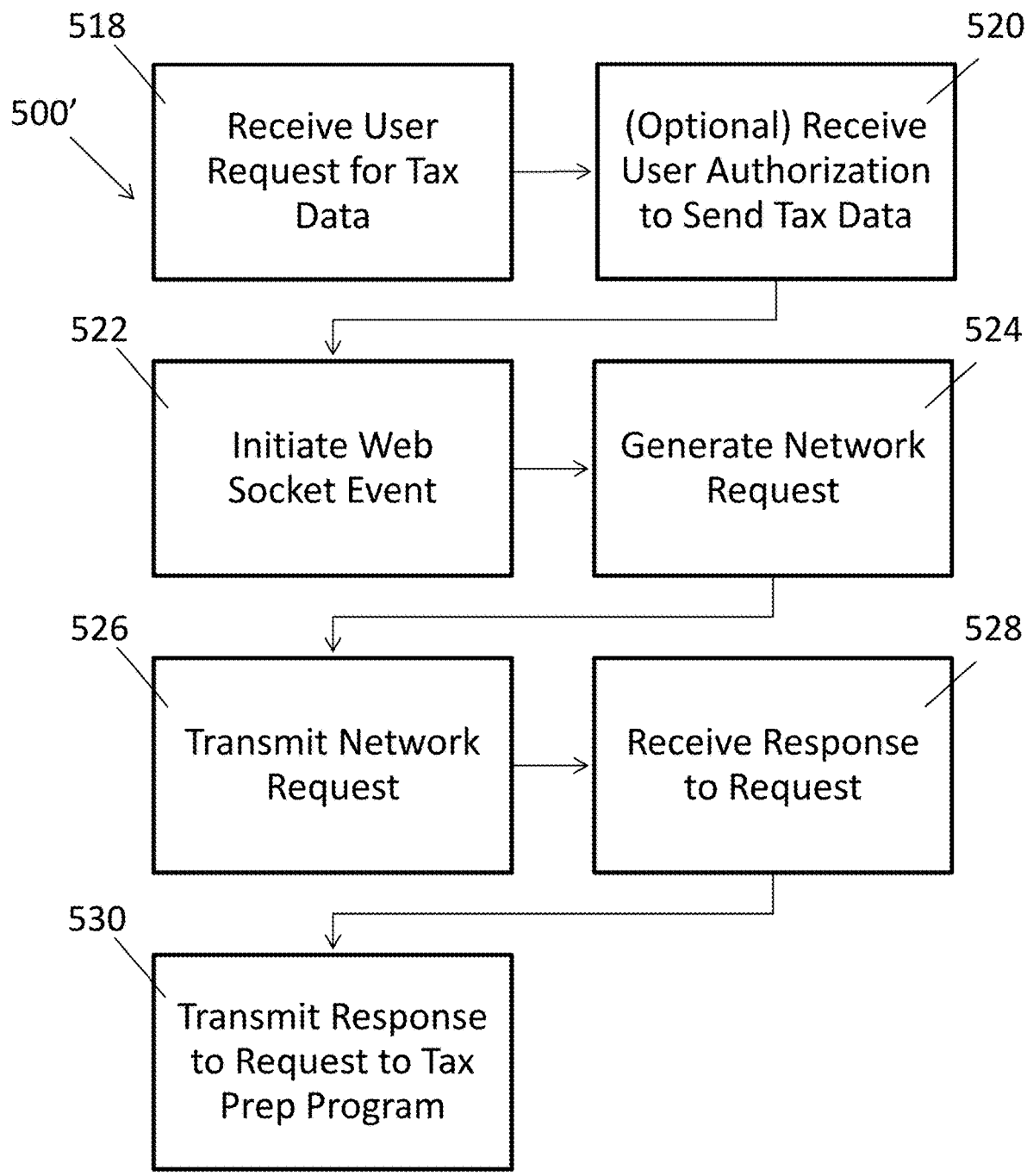

FIG. 18 depicts a computer-implemented method 500' executed according to one embodiment by a system 100, 300 including a tax data acquisition browser 102, a tax data source program 116, and a tax return preparation program 116, as shown in FIGS. 3 and 8. The tax data acquisition browser 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The user interface 112 and the web engine 114 are communicatively coupled by a network 110. Further, the web engine 114 and the tax data source program 116 are communicatively coupled by the network 110. Moreover, the web engine 114 and the tax return preparation program 116 are communicatively coupled by the network 110.

At step 518, the system 100, 300 receives a user request for tax data. For instance, the user request may be selection of a user interface object 136 associated with tax data (a W-2 form as shown in FIG. 14). The user interface object 136 may be part of a secondary webpage 138 emulating a webpage of a tax data source program 116. Annotating user interface objects (not shown) may be overlaid on top of the secondary webpage 138 to guide a user to the user interface object 136 associated with the tax data. This method leverages the user's navigation of the tax data source program 116 to for the system 100, 300 to "learn" the steps needed to acquire the tax data. Accordingly, these user commands may also be sent to a tax return preparation program 120 for storage with user authorization.

At step 520, the system 100, 300 optionally requests and receives user authorization to send the tax data to the tax return preparation program 116. User authorization provided at this point in the process typically only applies to the tax data associated with the user interface object 136. User authorization may not be required at this point in the process (e.g., if user authorization for a general class of tax data was previously provided).

At step 522, the user interface 112 initiates a web socket event to the web engine 114 via the network 110 in response to the user data request. At step 524, the web engine 114 generates a network request based on the web socket event. For example, the network request may be an HTML or a CCS request resulting downloading of a W-2 form (e.g., in PDF format).

At step 526, the web engine 114 transmits the network request to the tax data source program 116 via the network 110. Examples of tax data source programs 116 include, but are not limited to, those associated with payroll processors (as in FIG. 12), bank accounts, and investment accounts. At step 528, the web engine 114 receives a response to the network request from the tax data source program 116 via the network 110. The response may be tax data (e.g., a PDF of a W-2 form). At step 530, the web engine 114 transmits the request response (e.g., the W-2 form) to the tax return preparation program 120.

The methods 400, 400', 500, 500' depicted in FIGS. 15-18 involve interactions between a tax data acquisition browser 102 (a user interface 112 and a web engine 114), a tax data source program 116, and a tax return preparation program 116. The networked communications between these system components occur in real-time, such that the user's experience is one of a secondary webpage 138 opened within a primary webpage 134, with no noticeable time lag in accessing the tax data source program 116 using the secondary webpage 138. The secondary webpage 138 can be a modal window in the primary webpage 134 such that the primary webpage 134 remains open, but is inaccessible, until the modal secondary webpage 134 is closed. The browser 102 may also be sandboxed on the client computer 104 to limit access to resources thereon.

While certain embodiments have been described with reference to tax data acquisition for a new user, embodiments are not so limited. Other embodiments may involve a user who has previously prepared a tax return associated with a particular unique tax ID number. User information, such as security credentials for the user and tax ID number from a previous tax year may have been previously provided by the user and stored by the tax return preparation program 120. In such embodiments, the tax data acquisition browser 102 may function autonomously or semi-autonomously, e.g., by using the previously provided security credentials to either automatically or semi-automatically access the tax data. In embodiments where the tax data is automatically access, the secondary webpage may only be executed (i.e., instantiated) without being rendered or displayed to the user. In other words, the tax data acquisition browser 102 may instantiate the secondary webpage and may use the previously provided security credentials to access the tax data without displaying the secondary webpage to the user. In order to facilitate tax return preparation program 120 collection of user information, the tax data acquisition browser 102 may display user interface objects configured to allow a user to authorize collection of user information by the tax return preparation program 120.

While embodiments have been described for acquiring tax data for use by tax return preparation programs, other embodiments include systems and methods for collecting third party data in general. Such systems and methods would have similar construction and function as the systems and methods for acquiring tax data described above. The third party data may be financial data for financial programs including a bill payment program (such as an online banking program) and a financial management system (such as MINT or QUICKEN financial management systems). Further, sources of data for financial programs (e.g., financial management systems) include, but are not limited to, an account the user has with an online social media website, third parties databases or resources (such as government databases or documents, such as property tax records, Department of Motor Vehicle (DMV) records and US Census data) and other external sources. MINT and QUICKEN are registered trademarks of Intuit Inc., Mountain View, Calif.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A web browsing system for acquiring tax data during electronic tax return preparation, comprising:
    a client computer configured to:
        render a primary webpage,
        receive interface data from a tax data source computer, the interface data defining content and format of a webpage hosted by the tax data source computer; and
    a browser server computer configured to:
        receive the interface data from the client computer,
        process the interface data to generate rendering instructions,
        transmit the rendering instructions to the client computer,
    the client computer further configured to execute the rendering instructions: rendering a secondary webpage that emulates the webpage hosted by the tax data source computer, wherein the secondary webpage is different from the primary webpage and is controllable by the client computer independent of the primary webpage.

2. The system of claim 1, wherein the interface data comprises data from the group consisting of webpage layout data, a web address, and authentication data.

3. The system of claim 1, wherein the client computer and the browser server computer are connected by a network.

4. The system of claim 3, wherein the network comprises the Internet.

5. The system of claim 1, wherein the client computer is also configured to transmit a tax data request to the tax data source computer.

6. The system of claim 5, wherein the client computer is also configured to receive tax data from the tax data source computer in response to the tax data request.

7. The system of claim 6, wherein the client computer is also configured to transmit to the received tax data to the browser server computer.

8. The system of claim 1, wherein the client computer is also configured to render the secondary webpage in a modal window in the primary webpage.

9. The system of claim 1, wherein the web browsing system is sandboxed on the client computer.

10. The system of claim 1, wherein the client computer is configured to request and receive authorization to send the tax data to a tax return preparation program running on a tax return preparation computer before the client computer accesses the tax data.

11. The system of claim 10, wherein the authorization relates to a plurality of tax data.

12. The system of claim 1, wherein the client computer is configured to request and receive authorization to send the tax data to a tax return preparation program running on a tax return preparation computer after the client computer accesses the tax data.

13. The system of claim 12, wherein the authorization is limited to the accessed tax data.

14. The system of claim 1, wherein the primary webpage is a webpage of an on-line tax return preparation program.

15. A web browsing system for acquiring tax data during electronic tax return preparation, comprising:
   a client computer configured to:
      render a primary webpage,
      receive interface data from a browser server computer; and
   a browser server computer configured to:
      receive the interface data from a tax data source computer, the interface data defining content and format of a webpage hosted by the tax data source computer,
      process the interface data to generate rendering instructions,
      transmit the rendering instructions to the client computer,
   the client computer further configured to execute the rendering instructions: rendering a secondary webpage that emulates the webpage hosted by the tax data source computer, that is different from the primary webpage and that is controllable by the client computer independent of the primary webpage.

16. A computer-implemented method of acquiring tax data during preparation of an electronic tax return, the method comprising:
   a client computer rendering a primary webpage;
   the client computer receiving interface data from a tax data source computer, the interface data defining content and format of a webpage hosted by the tax data source computer;
   a browser server computer receiving the interface data from the client computer;
   the browser server computer processing the interface data to generate rendering instructions;
   the browser server computer transmitting the rendering instructions to the client computer; and
   when the client computer executes the rendering instructions, the client computer rendering a secondary webpage that emulates the webpage hosted by the tax data source computer, that is different from the primary webpage and that that is controllable by the client computer independent of the primary webpage.

17. A computer-implemented method of acquiring tax data during preparation of an electronic tax return, the method comprising:
   a client computer rendering a primary webpage;
   a browser server computer receiving interface data from a tax data source computer, the interface data defining content and format of a webpage hosted by the tax data source computer;
   the browser server computer processing the interface data to generate rendering instructions;
   the browser server computer transmitting the rendering instructions to the client computer; and
   when the client computer executes the rendering instructions, the client computer rendering a secondary webpage that emulates the webpage hosted by the tax data source computer, that is different from the primary webpage and that is controllable by the client computer independent of the primary webpage.

18. A web browsing system for acquiring tax data during electronic tax return preparation, comprising:
   a client computer:
      (i) rendering a primary webpage comprising a tax return preparation user interface for a tax return preparation program;
      (ii) rendering a secondary webpage within the primary webpage, the secondary webpage emulating a webpage hosted by a financial account computer that is different from the primary webpage and comprising a financial account user interface for accessing a taxpayer financial account hosted on the financial account computer;
      (iii) receiving tax data from the financial account computer through the secondary webpage;
      (iv) receiving user data and user input from a user;
      (v) sending the user data and the user input to the financial account computer;
      (vi) receiving financial account webpage instructions from the financial account computer; and
   a browser server computer configured to:
      (i) receiving the user data and the user input from the client computer;
      (ii) receiving the tax data from the client computer;
      (iii) receiving financial account webpage instructions from the client computer, the webpage instructions defining content and format of the webpage hosted by the financial account computer;
      (iv) processing the received financial account webpage instructions into financial account webpage rendering instructions;
      (v) sending the financial account webpage rendering instructions to the client computer,
   wherein the client computer and the browser server computer are operatively coupled to each other.

19. A web browsing system for acquiring tax data during electronic tax return preparation, comprising:

a client computer:
- (i) rendering a primary webpage comprising a tax return preparation user interface for a tax return preparation program;
- (ii) rendering a secondary webpage within the primary webpage, the secondary webpage emulating a webpage hosted by a financial account computer that is different from the primary webpage and comprising a financial account user interface for accessing a taxpayer financial account hosted on the financial account computer;
- (iii) receiving user data and the user input from a user; and a browser server computer configured to:
- (i) receiving the user data and the user input from the client computer;
- (ii) sending the user data and the user input to the financial account computer;
- (iii) receiving tax data from the financial account computer;
- (iv) receiving web browser instructions from the financial account computer, the web browser instructions defining content and format of the webpage hosted by the financial account computer;
- (v) processing the received web browser instructions into rendering instructions;
- (vi) sending the rendering instructions to the client computer, wherein the client computer and the browser server computer are operatively coupled to each other.

20. A web browsing system for acquiring third party data, comprising:

a client computer:
- rendering a primary webpage,
- receiving interface data from a third party data source computer, the interface data defining content and format of a webpage hosted by the third party source computer; and a browser server computer configured to:
- receive the interface data from the client computer,
- process the interface data to generate rendering instructions,
- transmit the rendering instructions to the client computer, the client computer further configured to execute the rendering instructions: executing a secondary webpage that emulates the webpage on the third party data computer, that is different from the primary webpage, and that, is controllable by the client computer independent of the primary webpage.

21. The system of claim 20, wherein the third party data is financial data.

22. The system of claim 20, wherein executing the secondary webpage comprises rendering the secondary webpage utilizing the rendering instructions received by the client computer from the browser server computer.

* * * * *